(12) United States Patent
Bowers et al.

(10) Patent No.: US 10,795,337 B2
(45) Date of Patent: Oct. 6, 2020

(54) PREDICTIVE AND PRESCRIPTIVE ANALYTICS FOR SYSTEMS UNDER VARIABLE OPERATIONS

(71) Applicant: Incucomm, Inc., Addison, TX (US)

(72) Inventors: Matthew Bowers, Dallas, TX (US); Christopher Niblo, Mansfield, TX (US); Shane Poage, Plano, TX (US); James Robinson, Plano, TX (US); Steven D. Roemerman, Highland Village, TX (US); John P. Volpi, Garland, TX (US); Randall Allen, Orlando, FL (US); Eric Haney, Dallas, TX (US)

(73) Assignee: INCUCOMM, INC., Addison, TX (US)

( * ) Notice: Subject to any disclaimer, the term of this patent is extended or adjusted under 35 U.S.C. 154(b) by 605 days.

(21) Appl. No.: 15/611,476

(22) Filed: Jun. 1, 2017

(65) Prior Publication Data

US 2017/0351241 A1 Dec. 7, 2017

Related U.S. Application Data

(60) Provisional application No. 62/344,159, filed on Jun. 1, 2016.

(51) Int. Cl.
| | |
|---|---|
| *G06F 17/10* | (2006.01) |
| *G05B 19/406* | (2006.01) |
| *G06N 5/02* | (2006.01) |
| *G05B 13/04* | (2006.01) |

(52) U.S. Cl.
CPC ......... *G05B 19/406* (2013.01); *G05B 13/048* (2013.01); *G06N 5/022* (2013.01); *G05B 2219/34477* (2013.01); *G05B 2219/42058* (2013.01)

(58) Field of Classification Search
CPC ..... G06N 5/022; G05B 13/048; G05B 19/406
USPC .......................................................... 703/2
See application file for complete search history.

(56) References Cited

U.S. PATENT DOCUMENTS

| | | | |
|---|---|---|---|
| 2014/0330749 A1* | 11/2014 | Candas | G06Q 40/06 705/36 R |
| 2017/0102694 A1* | 4/2017 | Enver | G05B 19/41875 |
| 2018/0084073 A1* | 3/2018 | Walsh | H04L 67/2819 |

\* cited by examiner

*Primary Examiner* — Andre Pierre Louis
(74) *Attorney, Agent, or Firm* — Boisbrun Hofman, PLLC

(57) ABSTRACT

A communication system and method that provides predictive and prescriptive analytics for a system running at an edge. In one embodiment, the communication system includes an architect subsystem configured to build, test and deploy a model based on sensor characteristics of the system. The sensor characteristics are from at least one of an operator input, a historical input, a specification input, and a subject-matter expert input. The communication system also includes an edge subsystem configured to receive said model and perform predictive and prescriptive analytics on sensor data from said system running on said model deployed at said edge.

18 Claims, 19 Drawing Sheets

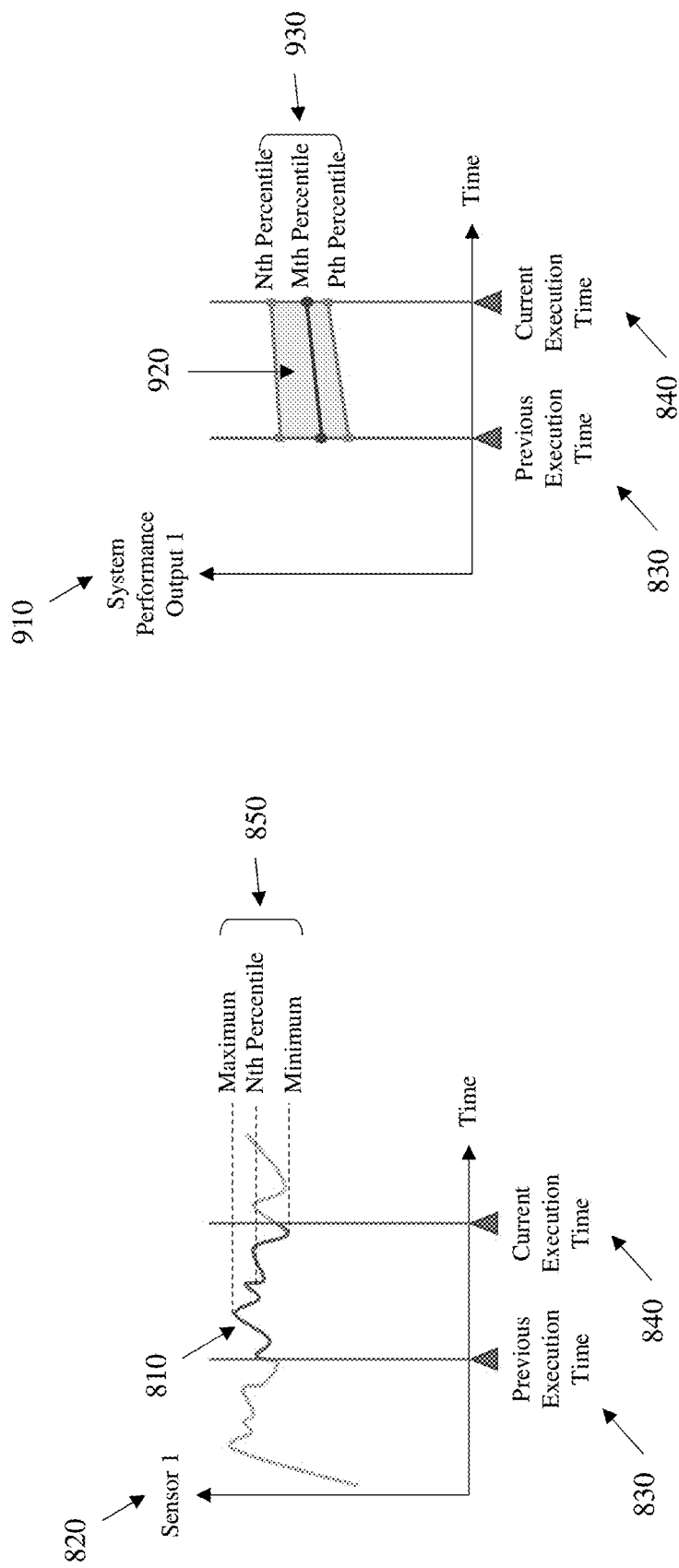

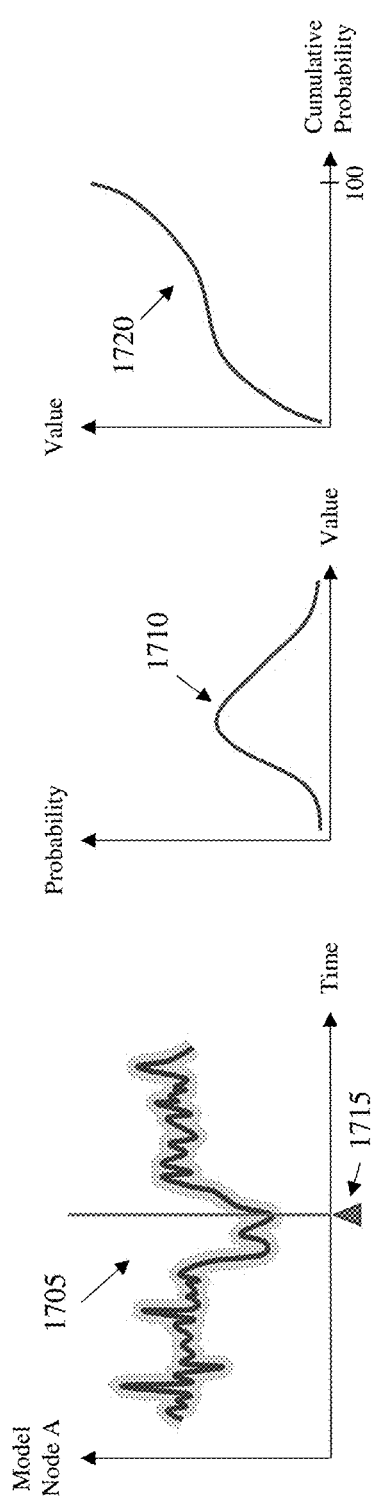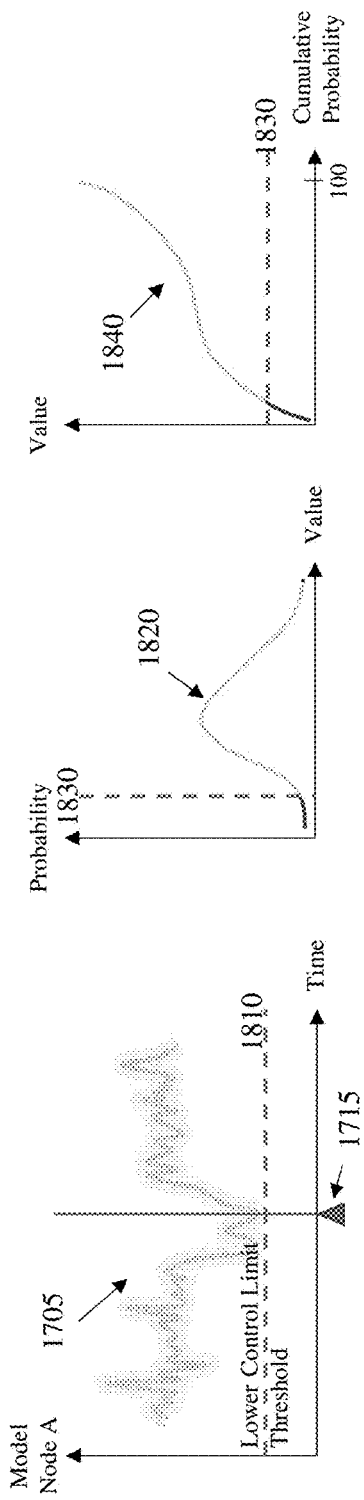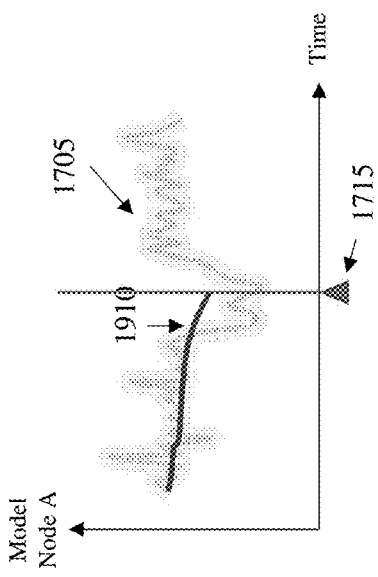
FIGURE 17
FIGURE 18
FIGURE 19

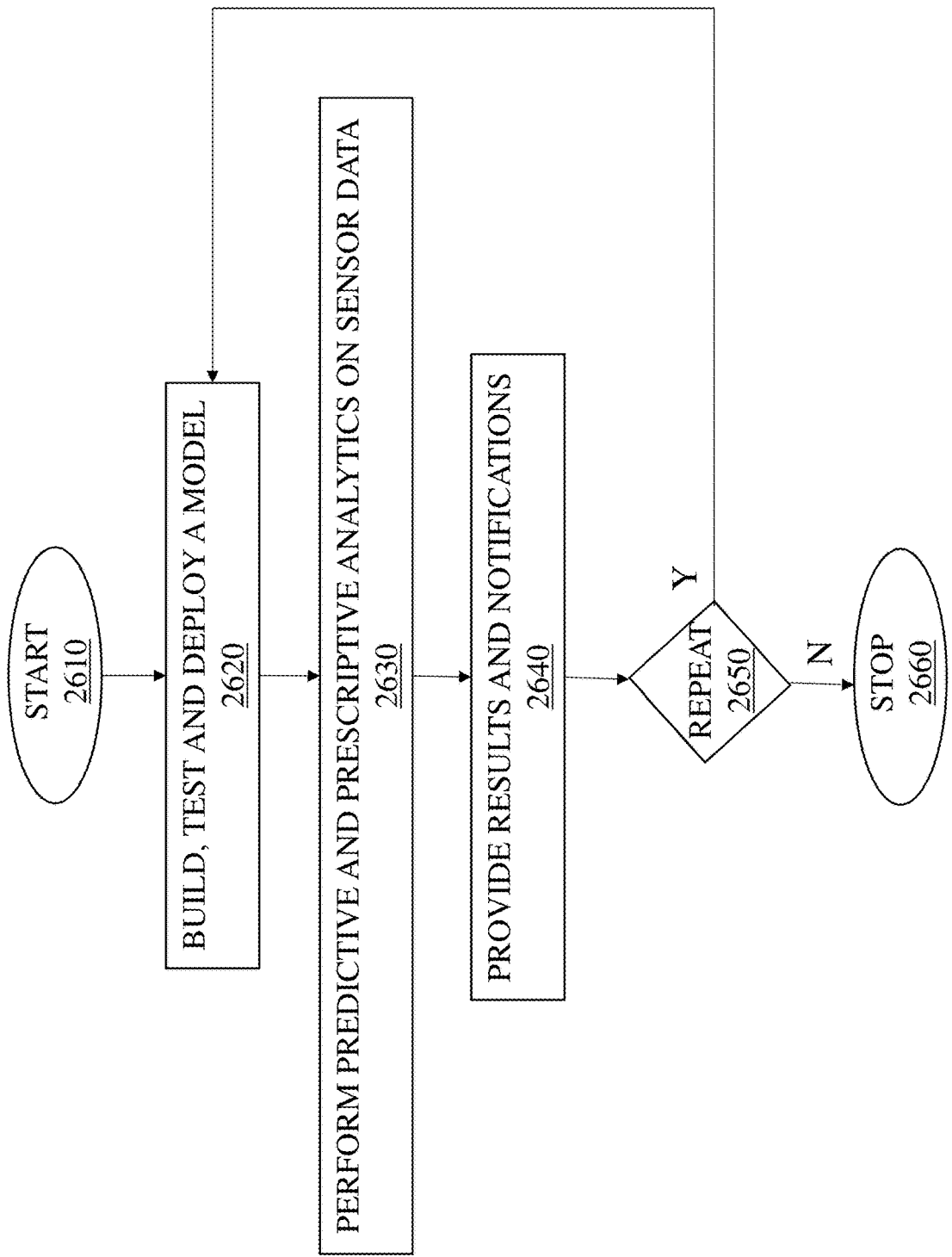

PREDICTIVE AND PRESCRIPTIVE ANALYTICS FOR SYSTEMS UNDER VARIABLE OPERATIONS

This application claims the benefit of U.S. Provisional Patent Application No. 62/344,159 entitled "AnalyticsOS," filed Jun. 1, 2016, which is incorporated herein by reference.

FIELD OF THE INVENTION

The present invention is directed, in general, to predictive and prescriptive analytics for applications including industrial systems, commercial systems and consumer systems with a variety of distributed systems collecting disparate information.

BACKGROUND

Industrial systems are increasingly complex including the protocols to manage the operations thereof. In an effort to characterize, improve and optimize the operation of industrial systems, organizations seek to collect as much data as possible from systems and subsystems. The proliferation of sensors (e.g., devices that monitor one or more physical characteristics) allows organizations to quantify the state of a system and, potentially, adjust operation of the system to improve performance. The data collected through the sensors, however, is not inherently actionable and requires some level of data analysis, human interpretation, or a combination thereof to be useful.

Current approaches in industrial systems analysis typically include networked connection of sensors to a central server or cloud-based network. Within the aggregate collection of data, machine learning or artificial intelligence techniques are applied to multi-dimensional datasets to quantify the correlation between measured system data and process performance outcomes. The feedback loop affecting operation of the industrial systems may occur in real-time depending on the connectivity of the system, the processing speed of the data analysis procedures, and the process rate of the underlying system.

In order to be useful for practical industrial applications, a network or cloud-based centralized data analysis approach requires several assumptions to be met. First, it is assumed that the correlation between measured data and process outcomes is sufficient to take action. The prescription of action is left to some layer of operational oversight that may need additional human judgement. Second, it is assumed that both the network connectivity and computational processing capability are consistently available within the industrial systems' operational setting and are sufficiently capable of fielding such solutions. If the latency between sensor data collection and prescription of action is significantly longer than characteristic process times, the approach is not appropriate for real-time application. Third, it is assumed that the type and number of sensors installed within the industrial systems are sufficient to gain insight through data analysis and/or data integration.

The analysis approaches that take aggregated data from one or more systems at the data server level are broadly categorized as 'big data' analysis and are further differentiated by the specific algorithmic approach taken. Big data approaches can involve the quantification of correlation between one or more observed system characteristics and the posterior outcome of system performance. A big data model typically employs both a set of data to teach the model the characteristics of the system (the training set), and a separate set of data to verify the accuracy of the model (the test set). As the complexity of the system increases or the number of data sources increases, the size of the training to sufficiently train an accurate big data model also increases. Once defined and verified, a big data model may be deployed in near real-time, however, the training, re-training and deployment of big data models is typically performed at the data center level where it is detached from the real-time operation of the system.

In contrast, there are methods of real-time control in industrial systems, although with reduced levels of analytic capability. A currently implemented real-time control system is a programmable logic controller ("PLC"). The PLC is most often configured with a ladder logic series of pre-defined decision gates to control the system operation. If discrete criteria for incoming sensor data are met, the system responds in a corresponding manner. Typically, no analysis or cause and effect modeling is performed on incoming sensor data. Typically, an upper and lower control limit criteria are defined for sensors that define the bounds for system control. Although this approach has significant applications for automated control of operational processes, the lack of insight provided into the cause of process outcomes and the pure deterministic approach to data collection means current real-time control systems are not sufficient to generate predictive and prescriptive action.

Therefore, what is needed is an analysis system capable of generating predictive and prescriptive action close to the point of operation of the industrial system (or other system) in a time relevant manner. The analysis approach may be predicated on cause and effect modeling of the system and its operation. The analysis system may be able to operate in settings with little or no network connectivity, and accommodate noisy and distorted sensor data feeds while still providing a quality result.

SUMMARY

These and other problems are generally solved or circumvented, and technical advantages are generally achieved, by advantageous embodiments of the present invention for a communication system and method that provides predictive and prescriptive analytics for a system running at an edge. In one embodiment, the communication system includes an architect subsystem configured to build, test and deploy a model based on sensor characteristics of the system. The sensor characteristics are from at least one of an operator input, a historical input, a specification input, and a subject-matter expert input. The communication system also includes an edge subsystem configured to receive said model and perform predictive and prescriptive analytics on sensor data from said system running on said model deployed at said edge.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention and the advantages thereof, reference is now made to the following descriptions taken in connection with the accompanying drawings, and which:

FIGS. 8 and 9 illustrate graphical representations demonstrating an embodiment of processing input data;

FIGS. 17 to 19 illustrate graphical representations demonstrating approaches for managing and analyzing stochastic variables;

FIG. 26 illustrates a flow diagram of an embodiment of a method of operating a communication system.

Corresponding numerals and symbols in the different figures generally refer to corresponding parts unless otherwise indicated, and may not be redescribed in the interest of brevity after the first instance. The FIGUREs are drawn to illustrate the relevant aspects of exemplary embodiments.

Figure 1:
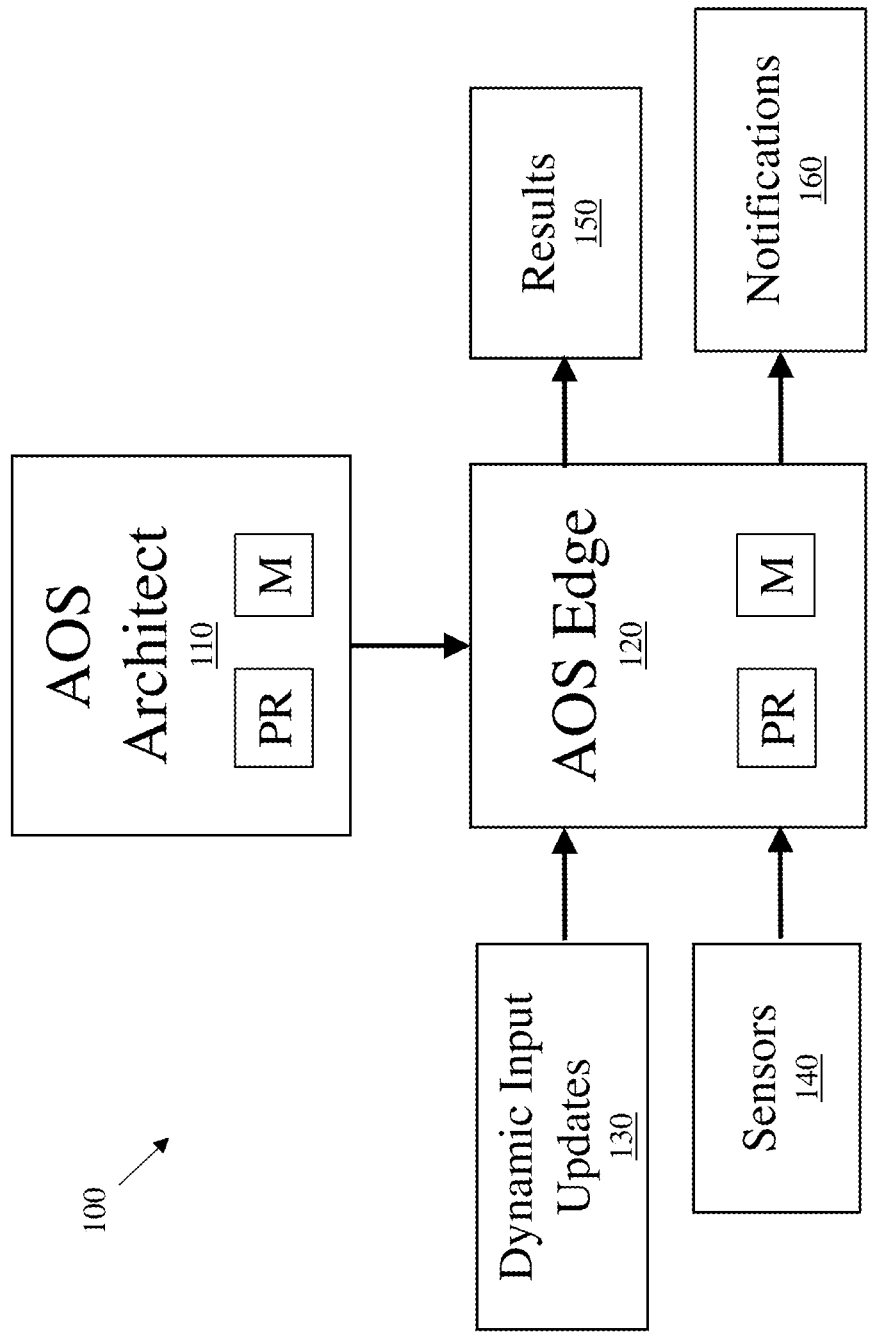
FIG. 1 illustrates a block diagram of an embodiment of a communication system 100.

The making and using of the present exemplary embodiments are discussed in detail below. It should be appreciated, however, that the embodiments provide many applicable inventive concepts that can be embodied in a wide variety of specific contexts. The specific embodiments discussed are merely illustrative of specific ways to make and use the systems, subsystems, and modules associated with a system and method that provides predictive and prescriptive analytics for applications. It should be understood that the term "system" refers in some instances to the "system" or "entity" (or portions or components thereof) being monitored (a "monitored system") and in other instances the term refers to the "system" performing the predictive and prescriptive analytics therefor.

A system will be described herein with respect to exemplary embodiments in a specific context, namely, a broad class of industrial systems and subsystems. The specific embodiments of industrial systems include, but are not limited to, motor systems, pump systems, motor-pump systems, hydraulic systems, actuator systems, and drilling systems. The principles of the present invention are applicable to operational maintenance and support in many fields including, but not limited to, manufacturing, maintenance, supply chain, inventory, electricity generation, oil and gas, and aviation. The specific embodied approach below is referred to as the AnalyticsOS ("AOS") platform including multiple components.

The system's ability to monitor diverse, non-linear data while accommodating noise, asynchronous data, limited bandwidth, limited processing power, limited computer memory, and limited data storage, with low latency, ease of system validation and other attributes have diverse applications with great benefit to a wide range of processes, industries, businesses, and fields of use. The system and applications include, but are not limited to, advances of the following natures: algorithmic, computer system, control system, data processing system, maintenance system, business system, safety system, risk detection system, risk management system, risk reduction system, optimal risk reduction, computer device, sensor management system, sensor optimization system, data compression system, fraud detection system, error detection system, error reduction system, fraud reduction system, error altering system, fraud alerting system, manufacturing control system, manufacturing monitoring system, drilling control system, drilling management system, drilling monitoring system, well control system, well monitoring system, well management system, pricing optimization system, energy management system, energy monitoring system, energy control system, automotive monitoring system, automotive management system, automotive control system, aviation monitoring system, aviation management system, aviation control system, predictive maintenance system, prescriptive maintenance system, predictive supply chain management system, prescriptive supply chain management system, optimal sensor estimation system, asset management system, asset routing system, and asset optimization system. Further, combinations of these advances will also be seen and understood by those skilled in the art. In addition, the system can accommodate operational efficiencies (e.g., optimization), supply chain/logistics efficiencies (e.g., optimization), maintenance and repair efficiencies (e.g., optimization), safety and risk efficiencies (e.g., optimization), and human productivity efficiencies (e.g., optimization).

An integrated comprehensive apparatus and/or system is introduced that provides the ability to generate complex decision analysis ("DA") based models, accept sensor data of various and disparate types, integrate it with human inputs, historical inputs, specification inputs, subject matter expert ("SME") inputs or any other inputs that may be useful for providing automated predictive and prescriptive solutions. The system can handle inputs and outputs stochastically. It takes full advantage of Markov Chain Monte Carlo processes as applied to the Internet of Things ("IoT"). Its applications can extend beyond the IoT to, for example, prediction and prescription (corrective action) of any future event to which a level of uncertainty is attached. The system can run without human intervention and analysis before any action is determined or taken. A graphical user interface ("GUI") based model building system constructs custom models. A model builder and distributor (AnalyticsOS ("AOS") architect) can be remotely deployed (from the system under test). The system can take the results of multiple independent models and integrate them into a super or aggregate model and, in so doing, obtain results not available in any single model. The system can run multiple independent models simultaneously in a single gateway. The system integrates decision analysis with the IoT including both decision analysis in a generic definition of analysis done to guide decisions, and as formally defined by the management science and mathematical discipline.

The system includes an integrated test capability, and can detect and report on Black Swan events (a rare condition that may disproportionately affect a system performance outcome) for sensors and for calculated events. The system can accommodate very rare events with consequences disproportionate to the event. The system can alert and alarm on M samples of N population ("M-of-N") events where even a small (e.g., one percent) change in a sensor output can be detected and notified. An intelligent predictor is introduced that can be based on Kalman and other filter techniques where a long term event can be predicted well in advance of its occurrence and appropriate action taken. The system can comprehend single and multiple state filters (e.g., at least two).

The system contemplates a cause and effect approach to analysis. The cause and effect approach includes a quantified series of linked algorithmic connections between measured data (the cause) and overall system performance (the effect). The measured data may include, but is not limited to, data from embedded sensors, data from external sensors, manual operator input, and real-time process data. The overall system performance may be represented by, without limitation, system efficiency, system output, total operating cost, present operating conditions, predicted future operating conditions, predicted failure or downtime, or any quantified combination of the above. The connections between sources of measured data and system performance may be introduced by system specifications, physics-based relationships, statistical analysis of historical data, definition by system subject matter experts, or other suitable means. Complex systems may employ a combination and/or integration of more than one of the above approaches for proper definition of a system model.

During a model definition process, overall system performance is defined and denoted. The interaction between overall system performance and performance of subsystems (and/or elements or components) is decomposed until each model element is a knowable quantity that can be measured through sensors, characteristic input, human input, other data, or some combination often combined via algorithmic means. Initially, the model elements are expressed in terms of a suite of accumulated data. That is, the sensor and other inputs needed to accurately describe system performance are identified along with their connection to sub-elements and overall system performance.

Within instances where the system has not previously operated with sensors, a cause and effect approach to model definition stands to identify the type, quantity, and quality of sensors. In order to define the necessary quality of the input data, the impact of variation within the input data on calculated system performance is determined. This analysis on the system model allows a distinction to be made between input data elements and their impact on system performance according to their uncertainty. For data sources with large impacts to system performance, data accuracy requirements should increase. If the data cannot be measured more accurately, then a single data source may be replaced by multiple sub-elements within the system model and the collective results algorithmically determined. This process may be repeated until all input data elements are potentially available and the expected variance due to the measured data is within acceptable limits of system operation. The severity of outcomes to changes in system performance dictates the level of detail to define what is acceptable to specific systems.

Under instances where the system is already operating with embedded sensors or other sources of measured data, the modeling approach can be applied either as a guide for retrofit installation or as a quantification of risk due to not having a full complement of necessary sensors. Whereas some installations and operational settings may not allow for additional means of data measurement to be installed, a selected (e.g., the ideal) model framework can be used as a baseline to quantify the impacts of non-ideal data measurement and to allow for derived quantities from other means to be comprehended within the system model. This comparison is made to understand the inherent uncertainty introduced by including data sources that are not wholly descriptive of the system operation, cannot be measured without significant noise, or may be described by a series of multiple data sources in lieu of a single data source.

The cause and effect approach to analysis provides significant benefits over purely statistical methods, exemplified by machine learning approaches or purely deterministic approaches that assume the availability of clean reliable data. Machine learning algorithms seek to quantify the impact of the measured sources of data on all system performance metrics, including null or non-direct influences. The underpinned reasoning for why a measured data source (the cause) impacts or effects system performance may not comprehended with a statistical machine learning approach. A correlation between those data sources that most often align system performance outcomes is comprehended. Additionally, as the number of data sources increases or the number of sub-elements forming a system increases, the computational overhead to calculate machine learning techniques expands as an exponential, a factorial, or a titration depending on the specific approach selected. This "curse of dimensionality" can significantly outpace current computing power to model system performance in real-time, as system complexity and implementation of sensor sources grow as fast or faster than an increase in computing power.

In contrast, the cause and effect approach alleviates these issues by defining the effect on system operation by data causes, fundamentally eliminating non-causal impacts. That is, cause and effect analysis associates data sources with the direct impact on the system. In cause and effect modeling, the connection between performance of subsystem elements and overall system performance is made although a source of measured data that may include several layers of sub-influence before impacting system performance.

The system contemplates a stochastic approach to analysis. A stochastic quantitative description includes measured data inputs and system performance output, as well as intermediate sub-elements of the analysis. The measured data, especially sensors in real-world operational settings, is usually noisy. That is, for zero mean processes, the underlying quantity being measured is indicative of the trend or median value of a measured series of data points, but diverging measurements from the actual value are to be expected, even under stable operating conditions. Noise can be introduced from dynamic environmental conditions, integral uncertainty in the data collection hardware or software, and inherent variance in system inputs, among others.

Characterizing the operation of a system, process, method, device or apparatus in stochastic terms includes the inclusion of variability in data generated by both sensors and other means including through human judgement and estimates of current or expected system operation. Whether the system includes inherent variance in system operation, variance over time, variance from non-uniform inputs, human uncertainty, measurement certainty, static condition, or any other state of process variability, a stochastic approach is more descriptive of the operating status of the system than a deterministic approach. Although the median value of a measured data set is the most likely occurrence of the underlying data source, the less likely events above and below the median value should also be accounted for. If these tail events within measured data sets are discarded in favor of a single median or average expected value before proceeding in the analysis, the model may introduce significant risks of not correctly predicting system performance when these varying values are present. Especially in systems where small variances in system performance may correspond to large variances in system value (e.g., through downtime, cost or production output), the inclusion of stochastic data models is advantageous.

Due to the stochastic characterization of a system, diagnostic evaluation of the system may also be adapted from deterministic conventions. Whereas deterministic system diagnostics compare individual sensor data values to one or more thresholds, stochastic diagnostics associate a probability that the threshold is reached for a diagnostic state to be true. For instance, a stochastic diagnostic filter may deem the system to be out of bounds if there is greater than a five percent chance the system value is beyond a control threshold. By declaring a system state when a meaningful number of data points are observed or calculated, false positives from small fluctuations in incoming data can be reduced. This same approach may be applicable to all calculation steps of the stochastic model from sensor and other input values to final system performance outputs. In this way, the stochastic variance due to both univariate and multivariate effects of the system can be monitored and associated with system status that informs the operation of the system.

One skilled in the art will appreciate the power of a plurality stochastic processes. In exemplary systems, this approach provides coherent, probabilistic comparisons of potential actions. A high probability failure can be prevented, and can be prioritized over lower probability events, which would otherwise be the next tasks to perform. Analysis approaches that account for uncertainty, exemplified by Fuzzy Logic, may be applied at the edge, aggregate or enterprise level to prioritize actions. Employing a plurality of stochastic processes provides benefits including, but not limited to, prioritization of scheduled actions, such as the allocation of limited maintenance workers, or limited inventory of repair parts. An augmented (e.g., optimal) allocation of resources occurs when the system is configured such that edge system information is integrated at the enterprise level, and is further configured to include or integrate with workforce management functions, logistics inventory functions, or the like.

A system is also disclosed that involves analysis and feedback into system operation to occur in close proximity to the system (such as the edge) as defined by both physical and network location. Computational analysis close to the system under test is referred to as edge processing and is in contrast to cloud-based approaches that transfer measured data to intranet- or Internet-connected servers for computation. Cloud-based solutions perform the analysis at the data center level before transferring insights and actions back to the point of operation. In systems where characteristic cycle times are significantly less than the time to transfer data to the data center level and generate analysis, cloud-based analysis is used to provide historical insight into system operation, as opposed to real-time predictive and prescriptive feedback impacting system operation.

Edge processing unveils advantages such as little or no requirement for constant external network connection, reduction of cybersecurity requirements, and reduction in latency between measurement of data and analysis generation. The complexity of analysis is matched by the computational power of the edge processer to implement edge processing. Using a cause and effect analysis approach to system modeling (as described herein) reduces the amount of processing overhead needed, and commercially available edge "gateway" processing systems (e.g., Dell IoT Gateway 5500, HPE Edgeline EL20 Intelligent Gateway, and Intel IoT Gateway DK300) meet both connectivity and computational requirements to implement prescriptive analysis models. The edge processing can be integrated with data sensors and/or data center applications.

The edge processing provides many advantages including an ability to accept synchronous and asynchronous data, an ability to apply data fill techniques to align various data inputs appearing at various rates, an ability to analyze and trap data at the data input for anomalies and also trap other relevant data occurring at the same or similar time, an ability to accept data and inputs from disparate sources including manually entered data or decisions or status, an ability to accept input data in sub second increments, an ability to process data in a stochastic manner using Monte Carlo processing, an ability to compress data and present it stochastically, an ability to process data and note anomalies during stochastic processing and to present them for output in various ways including simple green-yellow-red alerts, and an ability to process multiple sensor data and combine them algorithmically to generate results that can then be analyzed. This is an improvement over just being able to analyze sensor data.

The edge processing provides many other advantages including an ability to post process stochastic, sensor and other input data via estimating filters and general algorithmic applications to provide predictive and prescriptive outputs. For a representative example, the ability to predict when a component or system will reach end of life or some fraction thereof. The edge processing provides many other advantages including an ability to output raw sensor data, stochastically processed results, and post processed results either locally or to a remote site via the Internet, an ability to generate messages in the form of e-mail, text, or other similar means for notification purposes, an ability, based only on the capability of the gateway, to simultaneously run multiple analyses on a single gateway, an ability to correlate data with variable delays, and an ability to store results for later analysis and correlation.

It is also comprehended that multiple cause and effect models (reference designs) describing one or more systems can reside within the same physical edge gateway device. This approach may be beneficial, without limitation, when there are a multitude of systems that require monitoring, if different modeling approaches are applicable at different timescales, to reduce installation impacts, or other such considerations. Similar colocation of models is also applicable at the aggregate, cloud and core processing levels.

As mentioned above, the computing system may be located at the edge, which is in close proximity from both a physical and network consideration to the systems, apparatus, or processes of interest, including the means by which data is being collected. The edge processing capabilities, however, may be constrained by processing speed, memory and other measures of computational performance. Thus, components of the computing system often located at the edge may be applicable at the network core, at an aggregated network hub, in a virtual computing cloud, or in some other non-local networked computing location.

Core and cloud processing may either be implemented as the primary means of analyzing system operation, to perform tangential analysis and control, to aggregate the operation and performance of multiple systems and classes of systems or apparatuses, or any combination of the above. By implementing edge processing that contains other characteristics of the computing system, the interface with the core and cloud computing environments can be greatly enhanced in terms of efficiency and effectiveness of data analysis over approaches that connect data collection processes and sensors directly with core and cloud computing systems. Applying cause and effect, stochastic processing, predictive analysis and prescriptive action to the operational status of the computing system or entity allows the core and cloud computing systems to receive data that has already been identified and assessed for impact to system performance. In addition, data can be preserved using such means as extensible markup language ("XML") tags, or stochastic information packet ("SIP") and stochastic library unit with relationships preserved ("SLURP") standards specified by a non-profit organization (probability management.org). In this way, cause and effect modeling or other data analysis methods performed at the core and cloud computing levels, as well as data storage processes, are simplified.

The computing system has the capability to predict (predictive analysis) the future operational status of the system. Utilizing cause and effect modeling along with a stochastic approach to the analysis allows further predictive analysis. By combining data with a physics-based approach and mathematical techniques, it is possible to predict future performance of a system or performance of corresponding subsystems. The capability includes prediction of a failure of the system or prediction of a limited capability status. Such a capability can be especially useful in the scheduling of maintenance actions.

Whereas the cause and effect analysis approach generates the system performance within a prescribed timeframe, the predictive analysis capability allows the time history of system performance from a series of model executions to forecast predictive analysis at a time in the future. This can be used to notify operators of the computing system or the system itself of potential variance from desired performance before the performance thresholds have actually been breached.

Two general approaches to forecasting can be implemented, both of which typically apply the application of an additional layer of analytical framework on top of the cause and effect analysis approach described herein. The predictive analysis can either forecast the future performance of the system at a specified time in the future, or predictive analysis can be used to determine the time to reach a specified performance level. Specific forecasting approaches may include, but are not limited to, linear regression, spline fitting, polynomial fitting, curve fitting, moving average, and filtering such as optimal filtering. The optimal filtering (e.g., as described by Kalman) provides a means for an apparatus or process to estimate its current state from a time history of stochastic system states. An embodiment of optimal filters extrapolates the current state of the system or process to determine the time to intercept a threshold such as an entity failure, maintenance task, or the need for a supply chain logistics request.

The time interval between analysis execution times and the expected variation of calculated system performance between analysis executions may dictate one forecasting approach over another. The speed of updates of predicted future performance to changes in recent system performance is a function of the forecasting approach and its configuration. A configuration that adapts too quickly may generate false positives and a configuration that adapts too slowly may fail to generate notifications sufficiently ahead of reaching system performance thresholds.

The production of prescriptive actions can be taken into account in the operation of the system such that system performance is maintained within desired thresholds. In order to generate prescriptive action, the performance of the system should first be predicted both at the current time, as well as in a forward-looking manner described herein with respect to the predictive analysis. The prediction of system performance at the current time is an outcome of the cause and effect analysis and predictive analysis. Forecasting future system performance from current system performance includes the application of trend analysis, the details of which depend on a time interval between data collection periods, characteristic time period of the system, and a time interval between analysis executions.

Dictating prescriptive action from predictive analysis employs the codification of system operating procedures. The prescriptive actions may be internal to the system such as modulating system operating settings or may be external to the system. External prescriptive actions may include, but are not limited to, introducing requests into a supply chain logistics system, scheduling maintenance actions, or modulating operations of other systems. Cause and effect characterization of the system, entity, method, and devices is an important concept for the implementation of reliable and rapid prescriptive action. Brute force machine learning, naïve neural networks, Bayesian inference based on correlation and other forms of machine learning or artificial intelligence can be slow, use persistent and unaffordable bandwidth, and have a computing footprint incompatible with edge operation. In addition, these approaches employ a set of system processes on data with which to learn the correlation between operational status and system performance. Within implementation instances where the methods have not been exposed to the pending problem, the cause and effect approaches provide the predictive and prescriptive benefits described herein.

As exemplary examples, prescriptive actions may be requested through several categories of human interface. First, the analysis may dictate suggested prescriptive actions to operators through communication ports located in the edge gateway. This may include email, text, phone, fax or other communication media to one or more operators about the current and future status of the system. Within this category, execution of the action is left to the operators. Second, the analysis may interface with system controls, but with some further human action. This may include tripping indicators native to the system or its operating environment.

Third, prescriptive actions may immediately be introduced to the system control to impact system operations without the requirement for human intervention. This approach could be employed for mundane operational changes that are deemed to not use human-in-the-loop response, or may be employed for time-critical responses that have significant risks if not addressed immediately.

In order to generate prescriptive actions, a data filtering process may be used. Under circumstances where incoming measured data has variance or the effect on system performance is uncertain, a filter may be applied within the cause and effect model. The filter will designate thresholds of calculated system performance to generate specific prescriptive actions. Additionally, the filter may be associated with a portion of the system performance distribution. In this way, the filter can reflect the system operation's tolerance for deviation, if any. If the numeric threshold for a system performance filter is not met, the defined prescriptive action is not taken. Just because one prescriptive action is not met, a separate prescriptive action defined by its own series of thresholds may be triggered. One or more prescriptive actions integrating with one or more notification means may be associated with each prescriptive model filter. In this way, a range of prescriptive actions can be defined based on the severity of deviance from desired system performance and align with system operational processes.

The system as described herein enables the adaptation thereof, the assessment of the system's operation, and the control of the system to a multitude of sensor conditions. In establishing the configuration of a system or component thereof, first establish a beneficial sensor (e.g., the most beneficial sensor) and overall data monitoring configuration. The selection of the sensor and system configuration considers the costs of sensors, data monitoring, installation, other cost matters, as well as the benefits and/or risks to safety, environmental regulatory compliance, and workplace rules, among others. In order to prescribe a desirable sensor configuration, the system may use the cause and effect relationships identified herein. Deviations from baseline cause and effect relationships, either through the degradation or enhancement of data monitoring capabilities through variations in installed type and quantity of sensors, change in data sampling rate, change in accuracy of a monitoring process, or change in resolution of the monitoring process, can be comprehended through the same cause-effect construct.

Enhancement (e.g., optimization) of a system and data monitoring configuration employs an additional layer of optimization sub-analysis that includes synthesis of system performance metrics defined in the cause and effect relationship with the impact of expected process outcome. The severity of the benefit and risk of a process outcome will have a significant impact in the proximity of the data monitoring configuration to the optimal configuration state. That is, a system with more extreme or costly outcomes will demand a data integration configuration that is more closely aligned with the ideal monitoring setup than a process that has relatively inconsequential outcomes. As an example, the optimum sensor configuration for a sewage pump would be different than the optimum configuration of a critical pump in a nuclear reactor. While both are pump systems that share an ideal system data monitoring configuration, the severity of outcomes in the nuclear pump dictates a more comprehensive data monitoring and analysis configuration, even when considering the additional monetary and non-monetary costs.

The exemplary systems and apparatuses under control at the edge are highly complex and have non-linear operational characteristics. As a result, common linear optimization methods are ineffective or misleading. A system configuration optimization routine supporting nearly arbitrary degrees of non-linearity may be based on particle filter methods. The need to select the correct optimization methods, and the desire to implement particle filter methods or other extensible non-linear optimization methods should be taken into consideration.

Due to the potential for failure, non-use, or other degradation of sensors or other data monitoring processes, the system adapts to real-time changes in the data monitoring state of the system, component or process. This adaptation applies to the definition of the cause and effect relationship, the establishment of the data monitoring configuration, and the implementation of the above in the operation of the system. During the definition of the cause and effect relationships, the impact of degradation of sensors or other data monitoring process should be considered including quantification of system operational performance in parallel methods utilizing alternate causal data sources. In turn, the system configuration can be enhanced (e.g., optimized) for the level of redundancy for data monitoring processes and connectivity. During operation, the system continues to provide characterization of system performance, and prescriptive or predictive action where necessary, even in a state of absent or degraded data sensors either through constrained installation, failure, or other means.

A system, method, process or device with such optimization features is based on an integrated, cause and effect approach. The exemplary system based on stochastic processes operating at the network edge enables an integrated approach. The integrated approach includes, but is not limited to, the integration of configuration optimization, automated deployment systems, automated monitoring systems, automated reporting systems and other features described herein.

The system also allows the application of enhanced (e.g., optimal) system, apparatus, device, process or method responses to ongoing and stochastic operation. Implementation of optimization methods uses the application of non-linear optimization methods (described in relation to optimal system configuration) embodied by particle filter optimization routines. The results of operational optimization are directed into prescriptive actions. The degree of automation of system control that impacts the operation of the affected system is defined within the same guidelines of other prescriptive actions. As such, operational optimization can be employed at the edge level to enhance the performance of a single system or component, or operational optimization can be employed at the enterprise data server level to enhance the operation of multitudes of systems and classes of systems, as well as employment at any intermediate layer of aggregation.

Referring initially to FIG. 1, illustrated is a block diagram of an embodiment of a communication system 100. The communication system 100 includes an AOS architect subsystem 110 (including a processor ("PR") and memory ("M")) and an AOS edge subsystem 120 (including a processor ("PR") and memory ("M")). For an exemplary discussion of a processor and memory see FIG. 3. The AOS architect subsystem 110 includes cause and effect model building, testing, and deployment functions described in more detail with respect to FIG. 6. The AOS architect subsystem 110 is primarily employed on personal computing devices such as laptops and desktops, among others.

Figure 3:
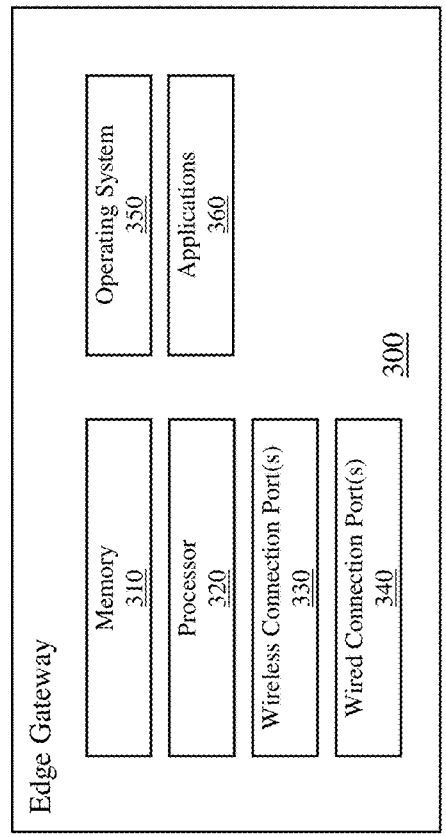
FIGS. 3 and 4 illustrate block diagrams of embodiments of edge gateways employable in a communication system.

During the model deployment phase, there is a transfer of the cause and effect model and pertinent deployment configuration information to the AOS edge subsystem 120, which is typically operating on an edge gateway described with respect to FIG. 3. The AOS edge subsystem 120 generally includes data collection, analytical, and result functions described with respect to FIG. 5. The AOS architect and edge subsystems 110, 120 may be collocated on a shared computational device, but can also be physically separated and communicate via the Internet or other suitable means.

The AOS edge subsystem 120 accepts dynamic inputs in two principal forms, namely, dynamic input updates 130 and sensors 140. The dynamic input updates 130 can be in various forms, including but not limited to, manual status inputs, decisions, data not directly from sensors, sensor data from other databases, historical data, and general data from other databases. The sensors 140 represents data coming from sensors in real-time or near real-time and processed by the AOS edge subsystem 120 in real or near real-time.

The primary outcomes of the AOS edge subsystem 120 are output as results 150 and notifications 160. In one embodiment, the results 150 are primarily model and post processing outputs presented in a database, for example, a message queuing telemetry transport ("MQTT") protocol, or any other suitable data exchange protocol. These can be stored, processed, or analyzed locally or remotely. The notifications 160 can be of many forms, including but limited to, e-mail, text messaging, status changes of the system, and alarms that are generated by one or more triggering events within the AOS model.

The communication system including the AOS capability is a system that provides business and consulting services using predictive and analytical models. The system can provide this capability remotely (e.g., via a data center), or at the edge or point of need (e.g., at the data site). This disruptive advanced analytics platform takes decision-making to a new level. By providing predictive and prescriptive analytics at the point closest to where effective decision-making is required, operational outcomes are improved, unwanted latency is eliminated, and data costs are reduced. The AOS family of solutions is capable of operating at the "edge" of the network or in centralized locations based on the business outcomes the customer is looking to achieve. The modeling application is designed so that no programming skills or advanced math degrees are required to be effective, ultimately democratizing advanced analytics capabilities that drive smarter decisions and improved business results.

Figure 2:
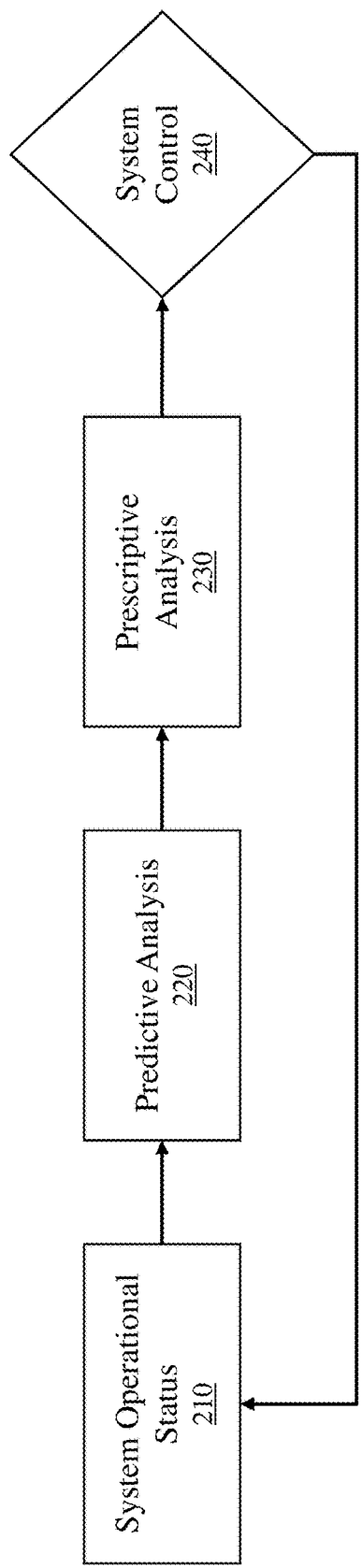
FIG. 2 illustrates a block diagram of an embodiment of process subsystems employable in a communication system.

Turning now to FIG. 2, illustrated is a block diagram of an embodiment of process subsystems employable in a communication system. A system operational status subsystem 210 includes a means by which its real-time characteristics are monitored. The process by which a system is monitored is referred to as a sensor. The sensors may be some combination of the following installation types, namely, integral to the system, integral to the system's subsystems, or external to the system. The operational status may also include data that is not generated by sensors, but which is integral to the characterization of the system. The non-sensor-generated data may include, but are not limited to, current operating state, maintenance schedule, expected system output, and expected system downtime.

A prescriptive analysis subsystem 230 is a computer-driven analysis model that provides prescriptive action to be taken with respect to the system. In order to provide the prescriptive action, a quantitative predictive analysis is performed by a predictive analysis subsystem 220 of an operational status of the system at the present time, as well as at some future time. The predictive analysis may include stochastic modeling of the cause and effect of operational impacts on the industrial system or component thereof, incorporating the following modeling elements such as embedded sensor data inputs, external sensor data inputs, non-sensor data inputs, system failure modes, connection between data inputs and system failure modes, system output, and connection between data inputs, system failure modes, and system output. Incorporating prescriptive analysis includes connecting system failure modes and output to potential actions that may have intended outcomes such as increased system output, or decreased system downtime.

A system control subsystem 240 controls the overall operation of the system. This may include informing human operators of a past, a current, and a future operational status of the system, as well as prescriptive actions generated by the prescriptive analysis subsystem 230 to perform on the system. Additionally, the system control subsystem 240 may also include mechanical or digital control systems that impact the operation of the industrial system. Human operators may or may not be in-the-loop when prescriptive actions are provided to the system control subsystem 240. The severity of the expected failure mode or divergence from expected output may proportionally drive the processes of the system control subsystem 240. The processes may include assignment of scheduled maintenance, status messages to human operators through text message, email, or a phone call, interface with supply chain and logistics management control systems, triggering of alert systems, alteration of system operational inputs, or system shut-down.

Stochastic processing, as described herein, includes accumulating a set of sensor data measurements and converting the same to a series of values (typically five probability values based on their numeric values of 10%, median, 90%, lowest value or low bound and highest value or high bound). The values are then used to generate a number of Monte Carlo runs of the model generated within the AOS architect subsystem 110 and executed in the AOS edge subsystem 120 (see FIG. 1).

Turning now to FIG. 3, illustrated is a block diagram of an embodiment of an edge gateway 300 employable in a communication system. The edge gateway 300 may execute the functions of the AOS edge subsystem 120 of FIG. 1. The edge gateway 300 can accommodate wireless communications (via a wireless connection port(s) 330) and wired communications (via a wired connection port(s) 340). The edge gateway 300 includes a processor 320 and memory 310 for executing an operating system 350 and applications 360.

The wireless communications can accommodate, without limitation, Wi-Fi, wireless wide area network ("WWAN") and Bluetooth and the wired communications can accommodate, without limitation, Ethernet. The operating system 350 is designed for operation in embedded devices and may be embodied by Wind River Linux or other Linux systems. The operating system 350 allows the installation of applications 360 that have access to incoming data through the connection port(s) 330, 340, as well as publishing authority to both the memory 310 or to external subscribers wired or wireless. The processor 320 is utilized for the applications 360 to execute stored processes, embodied by cause and effect models as described herein. The edge gateway 300 executes models built and tested on the AOS architect subsystem 110 (see FIG. 1).

The processor 320, which may be implemented with one or a plurality of processing devices, performs functions associated with its operation including overall control of a respective communication device. Exemplary functions related to management of communication resources include, without limitation, hardware installation, traffic management, performance data analysis, configuration management, security, billing and the like. The processors may be of any type suitable to the local application environment, and may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as non-limiting examples.

The memory 310 may be one or more memories and of any type suitable to the local application environment, and may be implemented using any suitable volatile or nonvolatile data storage technology such as a semiconductor-based memory device, a magnetic memory device and system, an optical memory device and system, fixed memory and removable memory. The programs stored in the memories may include program instructions or computer program code that, when executed by an associated processor, enable the respective communication device to perform its intended tasks. Of course, the memories may form a data buffer for data transmitted to and from the same. Exemplary embodiments of the system, subsystems, and modules as described herein may be implemented, at least in part, by computer software executable by processors, or by hardware, or by combinations thereof. Of course, other modules, subsystems, etc. (such as the AOS architect subsystem 110) may be operated on a computer system analogous to the edge gateway 300.

Figure 4:
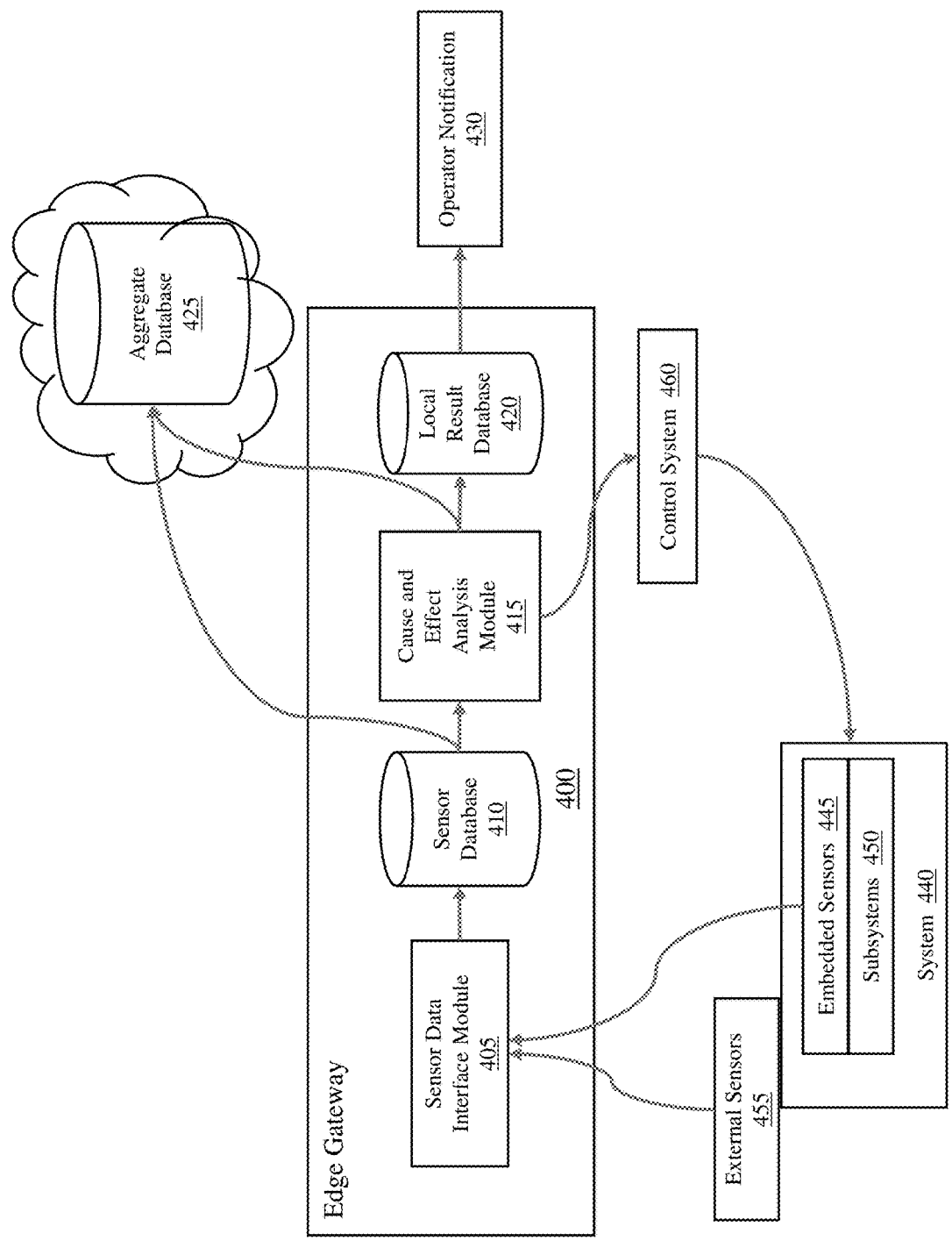

Turning now to FIG. 4, illustrated is a block diagram of an embodiment of an edge gateway 400 employable in a communication system. In addition to the subsystems described above with respect to FIG. 3, the edge gateway 400 includes a sensor data interface module 405, a sensor database 410, a cause and effect analysis module 415, a local result database 420 and an operator notification subsystem 430. The sensor database 410 and the cause and effect analysis module 415 provide information to an aggregate database 425, and the local result database 420 provides information to the operator notification subsystem 430.

The edge gateway 400 is coupled to a system 440 including embedded sensors 445 and subsystems 450, and coupled to external sensors 455. The edge gateway 400 and the system 440 are also coupled to a control system 460, which modulates the operation of the system 440.

As the system 440 is operated, data is generated by some combination of the embedded sensors 445 and the external sensors 455. The installation decision of embedded versus external depends on several factors including, but not limited to, manufacturing capability, sensor size, sensor environmental tolerance, and cost of installation. The subsystems or components 450 may operate independently, in series, or in parallel. Each subsystem 450 may have its own suite of embedded sensors 445 that may measure the same data variables as other subsystems 450.

At prescribed time intervals, data measured by both embedded sensors 445 and external sensors 455 are passed to the sensor data interface module 405. The connection between the embedded sensors 445 and external sensors 455 and the edge gateway 400 may occur through a wired port or a wireless port depending on the environment of the operating system. The sensor data interface module 405 is capable of receiving, as input, measured data from any connection port and provides the data to the sensor database 410. The sensor database 410 may have a defined data structure that is interpretable by common database programs and retains the measured data from system sensors.

The cause and effect analysis module 415 is an application within the edge gateway 400 designed with the cause and effect analysis approach, stochastic approach to analysis, and prescriptive action methodology. The cause and effect analysis module 415 subscribes through a standardized data interface to data sets from the sensor database 410. At prescribed execution intervals, the cause and effect analysis module 415 characterizes the data sets to which it is described with a stochastic standard. This process of applying stochastic standards reduces each data set to a known format that is extensible regardless of how many data records have been recorded within the current sensor data interval. In addition, applying stochastic standards to incoming data allows for sensor installations with disparate measurement intervals to interface within the cause and effect analysis module 415.

The cause and effect analysis module 415 executes a series of operations that quantitatively describe the impact of measured data of the system 440 and operation on predicted performance thereof. In addition, the cause and effect analysis module 415 makes a determination from measured predicted performance and measured system data, any necessary prescriptive actions. The prescriptive actions are characterized by their severity to system performance and their time sensitivity to action. The outputs of the cause and effect analysis module 415 characterize both the prediction of system performance and prescription of action to be taken, which are passed to and stored within the local result database 420.

The aggregate database 425 is either a locally-networked and cloud-based data server that collects resultant data from one or more edge gateways 400 or data directly from systems and their system control. From the edge gateway 400, the aggregate database 425 receives both the triaged sensor database information and the results from the cause and effect analysis module 415. The aggregate database 425 is used to store data for further investigation, to serve as the input into an aggregate-level cause and effect module that combines the inputs of several systems, or as a source of data to human operators and managers.

The operator notification subsystem 430 receives the prescriptive actions generated by the cause and effect analysis module 415 that is then passed to human operators. The operator notification subsystem 430 may provide notification in the form of a text message, email, phone call, or local system message. The prescriptive actions generated and passed through operation notification subsystem 430 may employ the human operator to take action on the system.

The control system 460 is the interface with the system 440 or with other systems impacting the operation thereof that modulates the operational status of the system 425. The control system 460 may be internal or external to the system 440 and may control solely the system 440 or it may control several systems. Based upon the prescriptive action generated by the cause and effect analysis module 415, the action of the control system 460 will vary. Actions may include altering system input settings to impact system performance towards expected levels, triggering local warning systems for human operators, or stopping the operation of the system 440 if system performance is sufficiently deviating from expected output. It should be noted that system operational status may generate more than prescriptive action under some circumstances, which will in turn generate more than one operator notification or interface with the control system 460.

Figure 5:
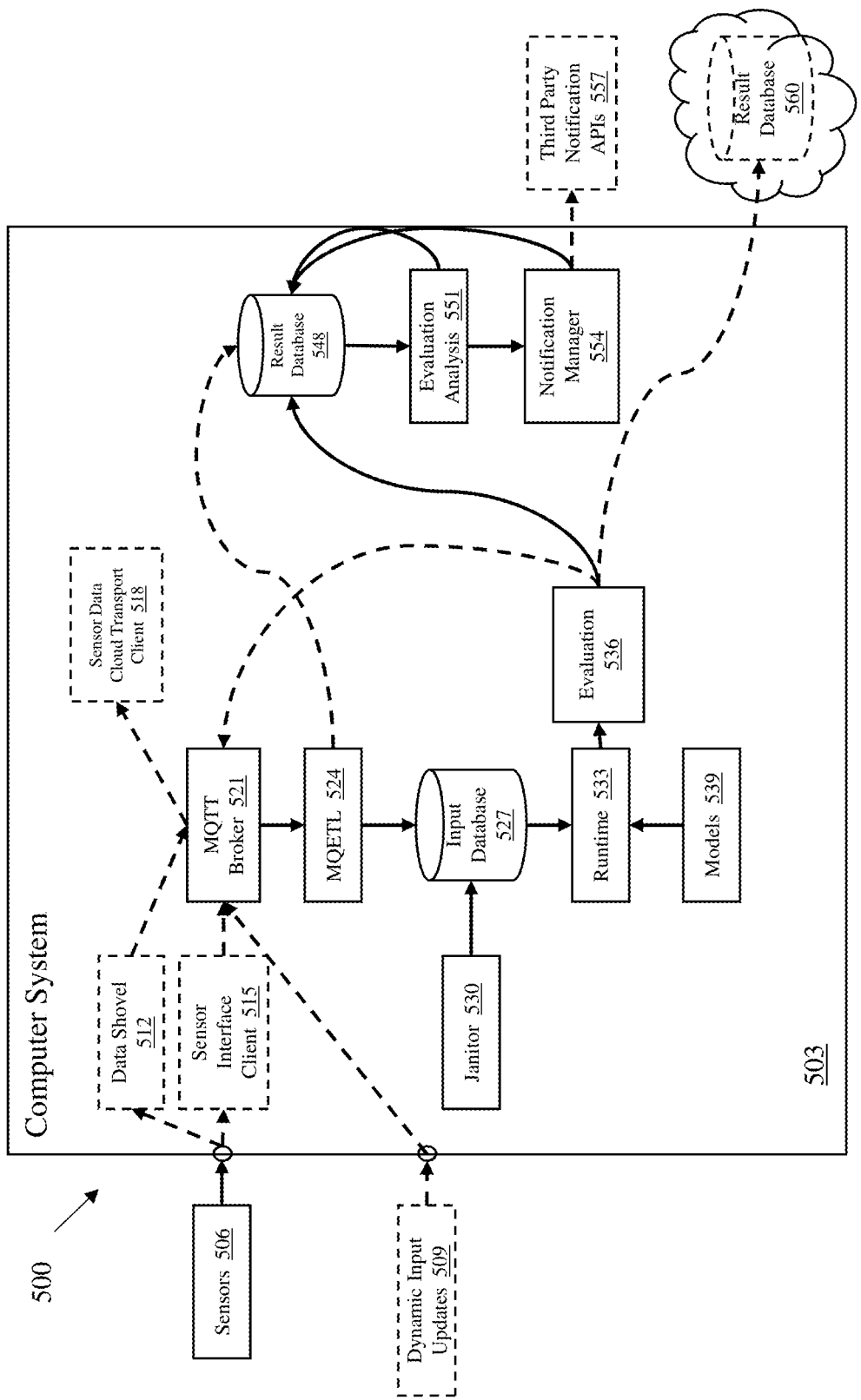
FIG. 5 illustrates a block diagram of an embodiment of an AOS edge subsystem embodied in a computer system.

Turning now to FIG. 5, illustrated is a block diagram of an embodiment of an AOS edge subsystem 500 embodied in a computer system 503 including at least a processor, memory and interface. While the present invention installs cause and effect analysis capability at the edge, the AOS approach comprehends the installation of the analysis within an edge, data center, or some aggregate computer system that resides between the edge and the data center.

In this embodiment, the AOS software suite may be written in Java and designed to be installed on intelligent gateways and/or servers. As a Java installation, it can be installed on Windows as well as UNIX/Linux systems. Intelligent gateways are devices designed to accept external sensor and other data with sufficient processing power to perform analytics at the sight of data collection. Some representative examples of intelligent gateways include, without limitation, the Hewlett Packard Enterprise EL20, the Intel DK300, and Dell IoT Gateway 5500. Additionally, the software suite may also be installed in high end servers, or small devices such as Arduino. The installation of the software suit may be manual or over the air via the Internet. This software shall accept data in real time from a variety of sensors and from manual inputs. It performs predictive and prescriptive analytics based on these inputs in near real time and provides the results locally, or to disparate sources, in the cloud. It also transmits data accumulated, as required and requested. The use of other software languages and their installation on a variety of computational devices beyond intelligent gateways to execute the operations as set forth herein are also comprehended.

Operational inputs characterizing system operation can occur in two primary modes such as sensors 506 and dynamic input updates 509, which are supporting real time and near real time data feeds that characterize an operation of the system. These may be human generated inputs. Embodiments of data sources that feed dynamic input updates 509 may include an operational status of the system, a maintenance status of the system, desired control inputs, or desired system performance. The dynamic input updates 509 are optional inputs depending on the system being analyzed.

A data shovel 512 is a component that provides an interface between different types of sensors 506 and formatting of data into an acceptable standard. A MQTT messaging standard may be employed within the data shovel 512 and published to the MQTT broker 521, which provides a standardized MQTT interface between data publishers and data subscribers. The MQTT broker 521 subscribes to the sensors 506, operational data that has either been processed through the data shovel 512, or through a sensor interface client 515 that interfaces with the sensors 506 and publishes data in the form of the MQTT messages. Additionally, the MQTT broker 521 also subscribes to the dynamic input updates 509 that are provided in the MQTT format.

A sensor data cloud transport client 518 is a component that subscribes to the MQTT data streams published by the MQTT broker 521. Data provided by the MQTT broker 521 is unprocessed data and the sensor data cloud transport client 518 is used as a backup to the raw input data for use in historical analysis, root cause analysis, or other uses.

A MQ export transfer layer ("MQETL") subsystem 524 is a MQTT subscription service adapted to meet the input requirements of the system software environment. Whereas the MQTT broker 512 is in a generic format agnostic of the subscriber application, the MQETL subsystem 524 is specific to an embodiment and acts as the data interface between the MQTT broker 521 that receives the sensor 506 and dynamic input updates 509 and a runtime subsystem 533 that contains the cause and effect analysis module.

An input database 527 provides a dynamic local cache of data to be used by the system environment in the execution of the system model. As data is accumulated from the sensors 506 and other data sources, it is stored within the input database 527. At regular intervals specified during installation or as a configurable setting, the input database 527 extracts the data values that have been accumulated between the previous time of execution and the current time of execution. The runtime subsystem 533 will see a batch of data, and comprehends the time history of inputs before the previous execution of the model where specified. During the course of operation, a janitor 530 may clear data from the input database 527 that is older than a defined cutoff limit. This database maintenance is performed to reduce the size of the input database 527 and to ensure memory limits are not exceeded.

The runtime subsystem 533 is a software environment that executes one or more models (e.g., AOS model) 539. In this embodiment, the runtime subsystem 533 is an installed application residing within the computer system 503. The cause and effect analysis modules may be embodied in one or more of the models 539. The models 539 may subscribe to one or more of the data sources published by the MQTT broker 521 and stored for execution within the input database 527. The models 539 may subscribe to the same data source or have disparate data sources, and may have model execution time intervals that are independent. Different models 539 are implemented to comprehend varying levels of system or subsystem operations which, as examples, may have distinct cycle times, performance variables, and/or extra-system interactions, among others. The different models 539 within the same computer system instance may also have their own interface protocol to operator notification systems and control systems.

After the execution of each model 539 at each execution interval, evaluation results from an evaluation subsystem 536 are generated within the native AOS data protocol and then interfaced as a MQTT publisher. The evaluation results may be subscribed by the MQTT broker 521 either as a method of hysteresis for compounding calculations or in order to push model resultant data to the sensor data cloud transport client 518. Additionally, a local result database 548 subscribes to the evaluation results. The result database 548 stores the execution results for the models 539 from the runtime subsystem 533 for a time period prescribed by the janitor 530.

As results are accumulated within the result database 548, an evaluation analysis subsystem 551 performs trend analysis on the time history of system performance characteristics generated within the models 539. Results from the evaluation analysis subsystem 551 may be employed in generating predictive analysis and prescriptive analysis. In this embodiment, thresholds of system performance or thresholds of time to reach a defined system performance are specified. When defining a threshold within the evaluation analysis subsystem 551, the method of communication with an operator or control system is specified.

A notification manager 554 receives the commands of the evaluation analysis subsystem 551 and interfaces directly, through a messaging protocol such as MQTT, through an application programming interface ("API," or some other means) with a notification system or with a control system. The notification manager 554 shall facilitate the interface between the AOS software environment and external communication standards via, for instance, a text message, email, a phone call, and any combination of the above or other suitable communication standards. This may include direct notification requests through third party notification APIs 557 that handle notifications and system control requests from one or more notification sources. When applicable, the third party notification APIs 557 are responsible for generating notifications to human operators of the system, system controls, or other suitable notification systems that vary with prescriptive or predictive operation of the system.

The evaluation results from the evaluation subsystem 536 may be transferred to an external result database 560. This may include a data center that is physically on-site or off-site, a cloud-based data server, or any other data server configuration. Data within the external result database 560 may be used, among other uses, as backup, as the input to aggregate analytical models, or to feed dashboards that report system operational status. According, the computer system 503 performs edge processing for predictive and prescriptive analytics for a monitored system.

Figure 6:
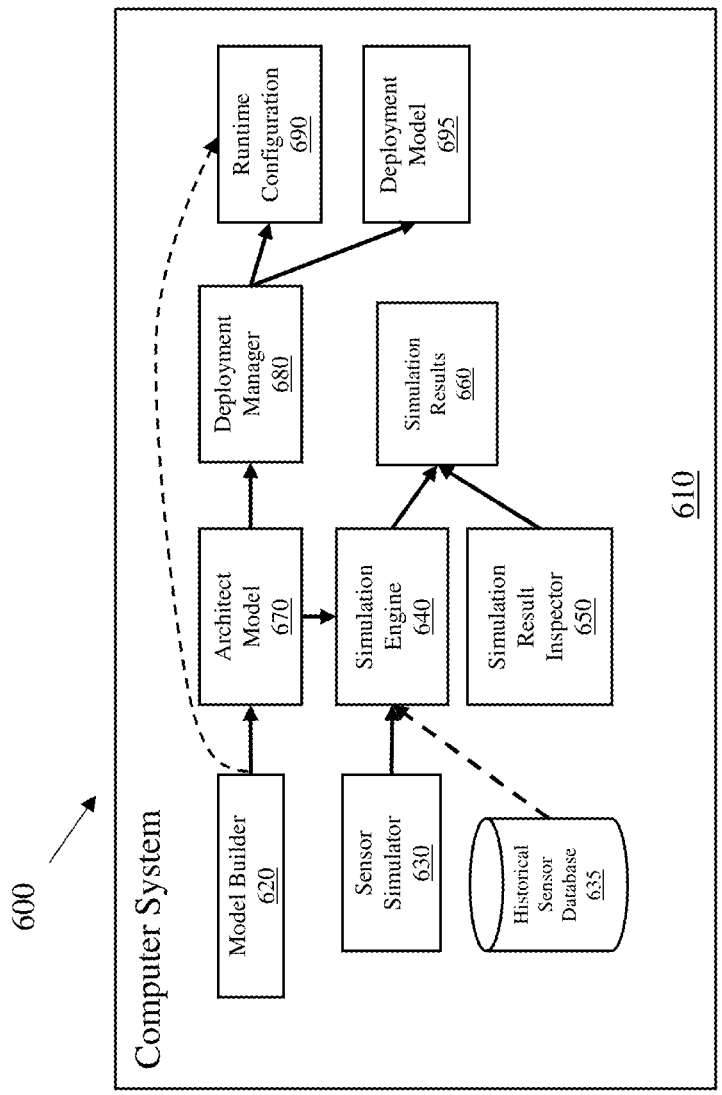
FIG. 6 illustrates a block diagram of an embodiment of an architect subsystem embodied in a computer system.

Turning now to FIG. 6, illustrated is a block diagram of an embodiment of an AOS architect subsystem 600 embodied in a computer system 610 including at least a processor, memory and interface. The AOS architect subsystem 600 includes a front-end user interface to develop, test, and deploy cause and effect modules. The AOS architect subsystem 600 may be embodied in a software suite, written in C# and/or Java or other suitable languages that are designed to be installed on laptops or equivalent computers. It has graphical user interface for aid in accomplishing the functions of the AOS architect subsystem 600, primarily the development, testing, and transmission of cause and effect models containing predictive and prescriptive analysis to AOS edge instances residing on an edge gateway.

A model builder 620 is a graphical user interface (or editor) for developing cause and effect models, associating sensor and other inputs, among other functions. The model builder 620 has been developed to generate cause and effect models for non-real-time modeling and analysis applications. The model builder 620 is discussed in further detail with respect to FIG. 7.

A sensor simulator 630 is a component that simulates the output of sensors for localized testing of architect models developed in the model builder 620. Both the rate at which sensor values are generated, as well as the output values produced by the simulated sensor are controlled from within the sensor simulator 630. Multiple sensor signals may be modulated and controlled at the same time from within the sensor simulator 630. Additionally, sensor configurations may be designated from within the model builder 620 and transferred to the sensor simulator 630 to represent univariate or multivariate scenarios that may impact specific functions or states of the cause and effect models, predictive analysis, or prescriptive action. The sensors may be created with a name, topic and interval. The sensor data may be sent as a user datagram protocol ("UDP") packet to a specified Internet protocol ("IP") address/port number. The sensor simulator 630 can load and save a simulator (or multiple simulator) configuration(s), view sensor history, provide GUI updates, log sensor information and send the sensor data to an MQTT. The sensor simulator 630 can pursue a random value strategy for sensor values between an upper and lower bound, which may be continually changed in real time via a user controlled strategy with continual updating. For instance, the updating may embody [increase/decrease] by a [value/factor] of [number] every [number, intervals/milliseconds]. A binary sensor strategy includes sending a random value of "0" or "1," for instance, a specified percentage of time.

A historical sensor database 635 is a component to integrate known historical sensor or other input data to drive evaluation results within a simulation engine 640. This functionality may be particularly useful to test the effectiveness of the AOS model when the time history of effecting events is known, i.e., the causal sensor values and system outcome effects are both comprehended within the historical sensor database 635. The historical sensor database 635 may be used solely in place of the sensor simulator 630, in conjunction therewith, or not at all. The functions described within a simulation result inspector 650 are not impacted by the testing configuration choice of the source of simulated sensor and other input data.

The simulation engine 640 is closely related to the runtime subsystem 533 (see FIG. 5), with the primary difference that the simulation engine 640 typically operates on a development computer (e.g., a laptop), and the runtime subsystem 533 operates on an operational computer (e.g., an edge gateway). The primary function of the simulation engine 640 is to evaluate the model developed in the model builder 620 and supplied with sensory data from the sensor simulator 630.

The simulation results are stored with respect to a simulation results subsystem 660 with associated timestamps of real-time evaluations of the simulation engine 640. The results may include sensor and other input data, interim calculations, system effect calculations, system state estimations, and notifications.

The simulation result inspector 650 is a component to view and analyze results generated by the simulation engine 640. Functionality exists within the simulation result inspector 650 to view notifications that have been generated within the simulation engine 640, including their associated calculation history and predictive threshold settings. Additionally, the simulation result inspector 650 includes the ability to view the results of any sensor or interim calculation that has been designated for output within the model builder 620. This includes viewing the most recent calculated results, as well the results from any time subset of the evaluation results. A deployment manager 680 manages the configuration and deployment packing of AOS models developed in the model builder 620 (via an architect model subsystem 670) and intended for operation in an edge environment. The architect model subsystem 670 is an editable file that contains definitions of the architecture and algorithms for evaluation of the respective systems.

A runtime configuration subsystem 690 is a command file evaluating one or more AOS models within the AOS edge environment, specifically operating within an AOS runtime. The runtime configuration subsystem 690 specifies settings that may not be specified within the cause and effect model built in the model builder 620, but which are necessary for operation within an AOS edge environment including, but not limited to, network settings for both inbound and outbound data communications, and definition of local or network paths for input and result data storage. An additional embodiment of the AOS architect subsystem may also generate an AOS runtime configuration directly from the model builder 620.

A deployment model 695 is an execution file that contains the functional algorithms of the cause and effect models and its associated evaluation rules generated by the model builder 620. The deployment model 695 is configured for execution within the runtime configuration subsystem 690, with the supplement of the runtime configuration described herein.

Figure 7:
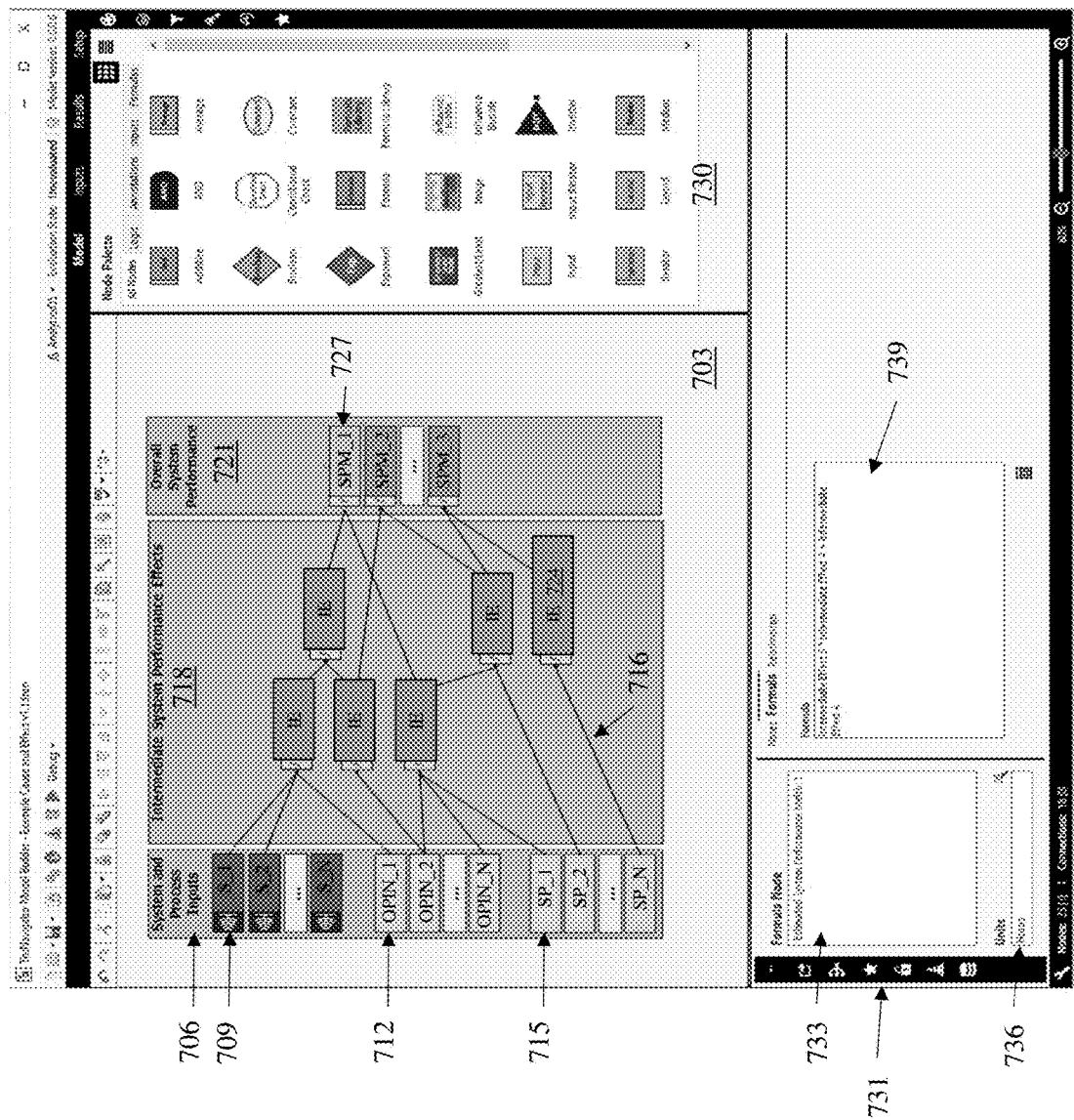
FIG. 7 illustrates a screen shot of an embodiment of a dashboard for building a model for a cause and effect.

Turning now to FIG. 7, illustrated is a screen shot of an embodiment of a dashboard for building a model for a cause and effect analysis. The dashboard includes a graphic user interface for developing the AOS models including a definition of evaluation rules and their resulting prescriptive notifications. While the AOS model is developed in C # for use on computer systems such as laptops, other languages may also be employed to advantage.

A model development canvas 703 contains a visual representation of calculation nodes comprehended within the AOS model. System and process inputs 706 are defined in three primary classes including sensor data inputs ("S_N") 709, operator inputs or decisions ("OPIN_N") 712, and system properties ("SP_N") 715. The sensor data inputs 709 include a definition of incoming sensor topic identifiers that are used in conjunction with the AOS sensor simulator, AOS historical database, and the AOS data shovel, among other components, to distinguish sources of sensor data and their values. The operator inputs 712 are functionally similar in that both are defined by a summary of their numeric distributions. The operator inputs 712, however, may be subject to frequent updates based on decisions or other outside influences to the system. The system properties 715 are known quantities for calculating system impacts, but are not readily measured or effected by outside forces.

Intermediate system performance effects 718 are those results relating system and process inputs 706 with an overall system performance 721 including one more system performance metrics ("SPM_N") 727. Each interim step in the calculation is denoted with a calculation node designated intermediate effect ("IE") 724 that has one or more node connections 716. The node connections 716 visually signify the transport of result calculations from the outbound (right) port of a calculation node 724 to inbound (left) input port of downstream calculation nodes 724. This method of graphically displaying the connection between system causes and system effects allows for transparency in the development and testing of the AOS model.

Each calculation node 724 may be designated from a node library 730. The node library 730 contains formulaic and logical expressions with standardized input, analysis, and output requirements. The following calculation types in TABLE 1 are exemplary embodiments of calculations covered in the node library 730.

TABLE 1

| Expression | Description |
| --- | --- |
| AND | Boolean logical AND. |
| Boolean | Node that evaluates a user-defined conditional statement as either true or false. |
| Conditional Check | Display of either the number or percentage of trail results that match a predefined condition. |
| Greatest/Least | Returns the greatest or least value amongst all its inbound influencers for a single, statistical trial. |
| Inverter | Boolean logical NOT. |
| NAND | Boolean logical NAND. |
| NOR | Boolean logical NOR. |
| OR | Boolean logical OR. |
| Percentage Switch | Evaluates its results by taking a defined percentage of each input node results and combines them to make 100 percent (%). |
| Image | Displays a user-defined image on the model development canvas. |

TABLE 1-continued

| Expression | Description |
| --- | --- |
| Layout | Visually groups items together. |
| Constant | Input that generates a constant value. |
| Influence Bubble | Generic placeholder for a node before its type is known. |
| Input | Input that uses a random distribution. |
| Input Iterator | Input that uses a random distribution iterated over a statistical population. |
| Sensor Data | Input that uses sensor data. |
| Table Input | Logical IF-THEN-ELSE tree for a single input. |
| Additive | Sums all inbound node results. |
| Average | Averages all inbound node results. |
| Exponent | Raises one inbound node to the power of another. |
| Formula | Open formula entry with algebraic expressions. |
| Formula Library | Predefined formulas of an inbound node. |
| Iterator | Provides the sum or average of a statistical population using the inputs of an individual. |
| Median | Selects the median value of inbound node results. |
| Multiplicative | Multiples all inbound node results. |
| Trailing Calculation | Calculates the sum or average of node results accumulated over a given time period. |

Node output settings 731 may be used to designate if a calculation node 724 will have a rounding strategy, if the results will be stored for output, or if evaluation rules will be triggered if result criteria are met, among other settings that dictate the output characteristics of the node results. Node name 733 and node unit 736 entry fields allow the general definition of the calculation node 724. These fields are consistent for all calculation node types. A node definition 739 is a variable entry pane depending on the calculation node type selected. Input type nodes (including sensor nodes) will have the definition of input distribution characteristics or the source of inbound data. Formula and logical calculation nodes employ a configuration specification that differentiates inbound nodes for the purposes of further calculation. By strategically positioning the nodes and connections thereto (e.g. can be thousands of nodes) within the model development canvas 703, the architect subsystem builds a model (e.g. can be thousands of lines of code) for a system for predictive and prescriptive analytics therefor.

Turning now to FIGS. 8 and 9, illustrated are graphical representations demonstrating an embodiment of processing input data. Within the processing of uncertain input data (see FIG. 8), there is a constant or variable stream of data 810 from a known sensor source 820. For model evaluation purposes, the stream of data 810 is segmented at regular time intervals for execution. All incoming values between a previous execution time 830 and a current execution time 840 are batched together and then summarized statistically as a data population 850. Within the data population 850, different approaches may be taken to characterize the sensor output, depending on the use of the sensor input within the cause and effect model such as, without limitation, creating an asymmetric Gaussian distribution, asymmetric Fat Tail distribution, a uniform distribution, and filtering only the maximum or minimum sensor value.

Model interim calculations and overall effect outputs are handled according to FIG. 9. For each system output 910, the distribution of results 920 is saved with an associated timestamp. Node results are typically summarized by defined percentile values 930 within their distribution of results 920, but other approaches may be applied. Results from the previous execution time 830 and the current execution time 840 may be correlated based on the percentile of the result distribution, which can be used for visualization and to make time-based trend predictions on the future system performance, among other uses.

Figure 10:
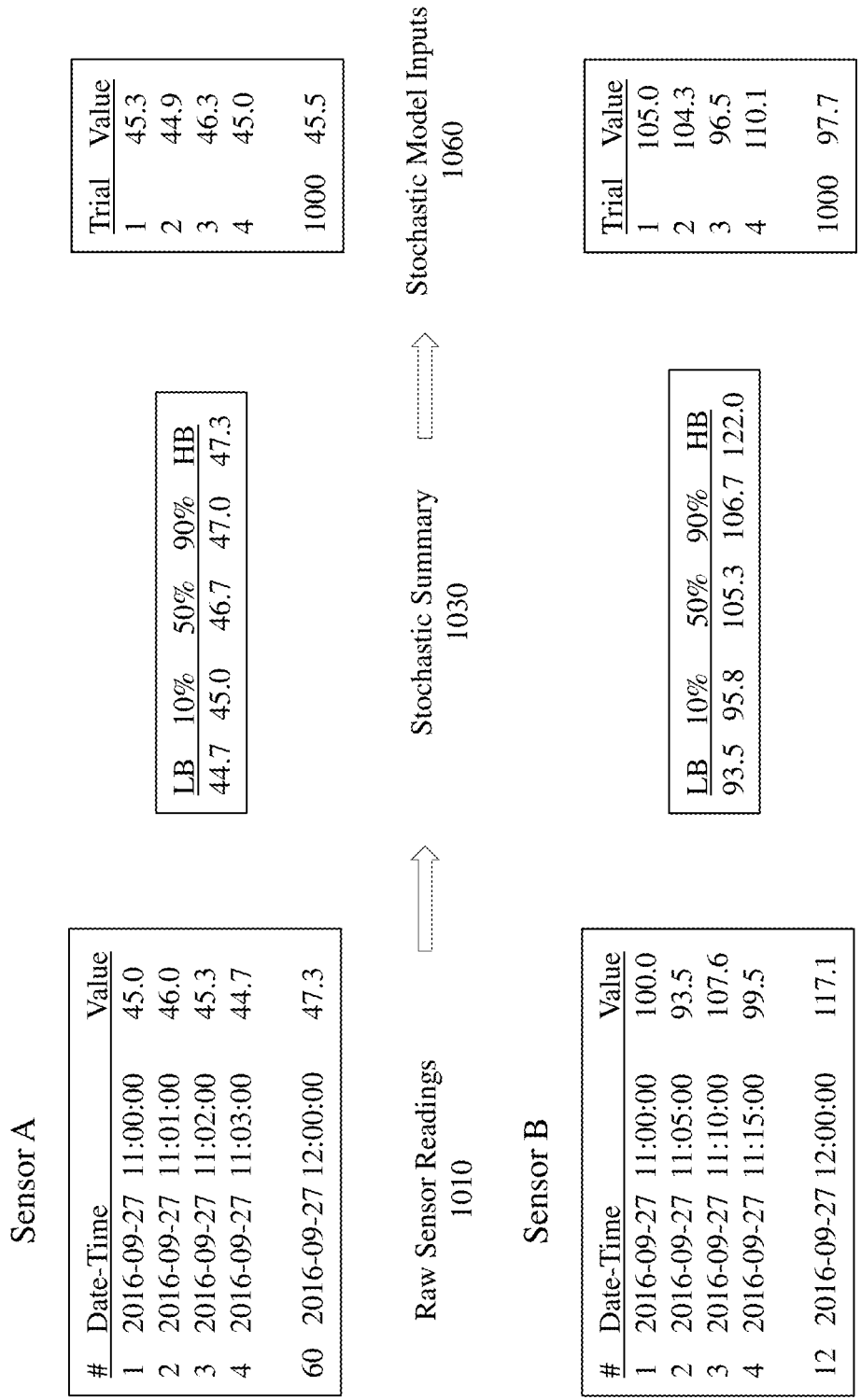
FIG. 10 illustrates a flow diagram of an embodiment of tabular results associated with a model for a cause and effect analysis.

Turning now to FIG. 10, illustrated is a flow diagram of an embodiment of tabular results associated with a model for a cause and effect analysis. During a first stage 1010, raw sensor values are read for a sensor A and a sensor B. The table for each sensor provides the number, date-time and value for each reading. While the time interval between readings is a property of the sensor and is typically configurable by an operator, it may have bounded limits due to system requirements and/or properties of the sensor(s). In this case, the sensor data values are for a fixed amount of time. The reporting rates of sensor A and sensor B may differ.

During a second stage 1030, a stochastic summary is provided for each sensor. The summary provides a distribution with low bound ("LB," e.g., a minimum), $10^{th}$ percentile, median (50 percentile), $90^{th}$ percentile, and high bound ("HB," e.g., a maximum) values employable to produce an asymmetric Gaussian distribution. Of course other approaches are possible such as a maximum value only, minimum value only, uniform, median value only, mode value only, and plus/minus sigma or other statistical or stochastic values as well. Also comprehended is the technique of correlating the data from at least sensor A and sensor B to ensure that timestamp-value pairs are as closely aligned as possible.

During a third stage 1060, stochastic model inputs are provided for each sensor. The inputs may be randomly generated trial values from each stochastic summary. Each set of trial values is then ready for further calculation within an AOS model. It should be noted that the number of trials for a model evaluation is a known constant, but can be adjusted during the model development and configuration phase. As the model is evaluated, the values for trial N are selected from each sensor data input and other input data nodes. Calculations then flow through interim calculations and arrive at overall system performance calculations. This process is repeated for all trials (in the exemplary embodiment 1000 trials). Depending on the general dynamic nature of the data, different values for the number of Monte Carlo trials can be chosen and are comprehended by this invention.

A primary benefit to the approach shown in FIG. 10 is the fusion of sensor data inputs that have variable sensor reporting rates and need not be synchronous. Different reporting rates can arise from varying sensor settings, system latency, outages, or through other means. The data processing approach also acts as a filtering and summarization process that limits the amount of data passed to higher level entities such as control systems, human operators, cloud systems, enterprise servers, or other data end-points. The approach evaluates batched data acquired between two discrete date-times and reports a summary of the sensor data values and, eventually, the outcomes on system performance. In this way, results, alerts, and notifications can be generated at a rate that is separate from the sensor data polling rate and more reflective of the end use-case of the system operation information. Although FIG. 10 shows parallel data processing flow of two sensors, the approach comprehends a multitude of sensors that are each measuring independent, complimentary, correlated, and/or disparate properties of the system or subsystem.

Figure 11:
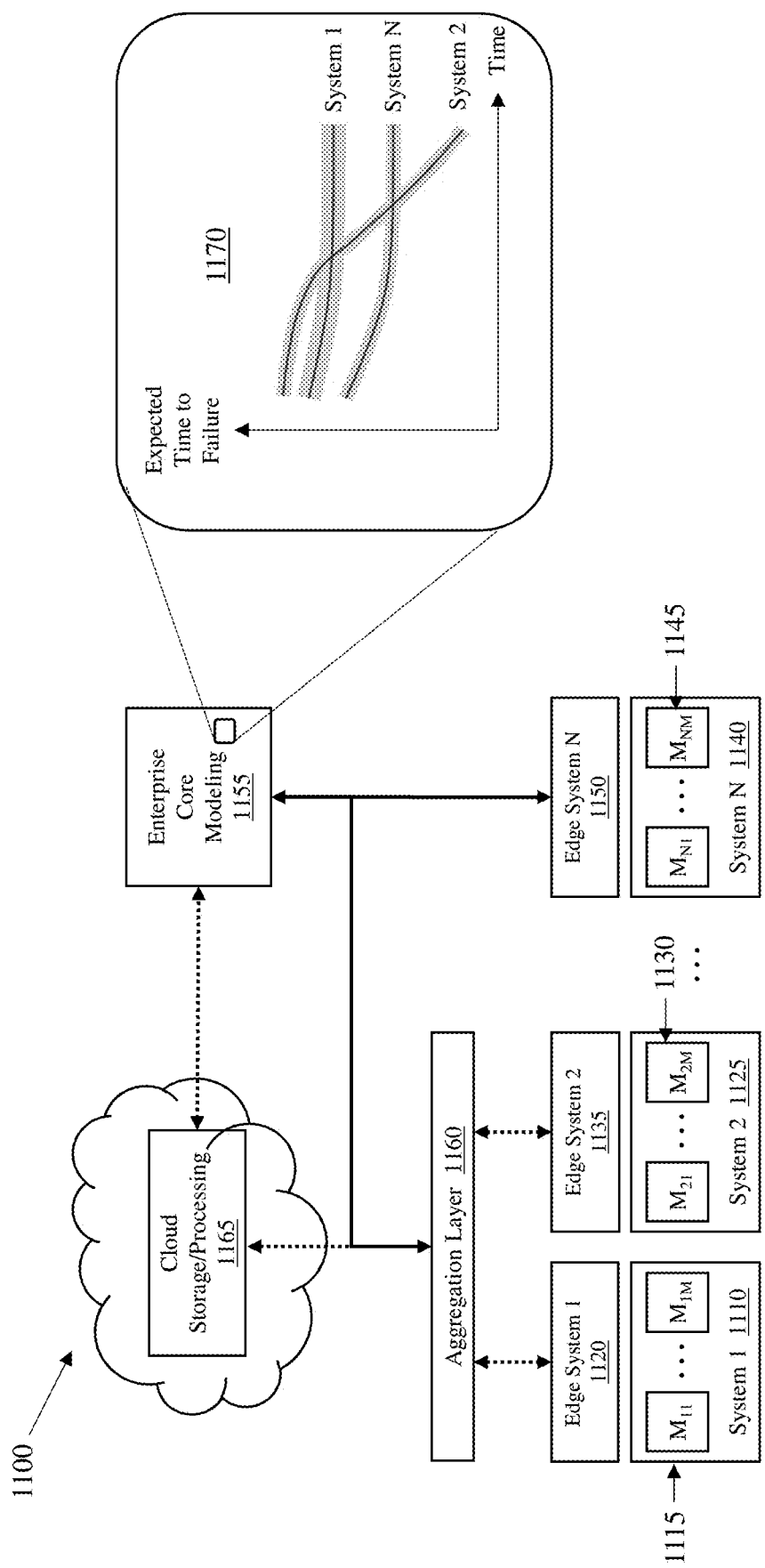
FIG. 11 illustrates a system level diagram of an embodiment of a communication system.

Turning now to FIG. 11, illustrated is a system level diagram of an embodiment of a communication system 1100 synthesizing multiple stochastic processes into aggregate, cloud and enterprise level approaches. The communication system 1100 includes a plurality of systems including system 1 1110 (with sensors, one of which is designated 1115, and coupled to an edge system 1 1120), system 2 1125 (with sensors, one of which is designated 1130, and coupled to an edge system 2 1135) and system N 1140 (with sensors, one of which is designated 1145, and coupled to an edge system N 1150). The edge system 1 1120 and edge system 2 1135 are coupled to an enterprise core modeling system 1155 via an aggregation layer 1160 and a cloud storage/processing system 1165. The edge system N 1150 is coupled directly to the enterprise core modeling system 1155.

The sensors 1115, 1125, 1145 monitor the operational status of the respective system 1 1110, system 2 1125 and system N 1140. The system 1 1110, system 2 1125 and system N 1140 may be analyzed by one or more cause and effect models residing on the respective edge system 1 1120, edge system 2 1135 and edge system N 1150. Each edge system 1 1120, edge system 2 1135 and edge system N 1150 may be isolated to a single system, or may encompass a plurality of systems where the physical, network, and other restrictions allow. The collection of similar or disparate systems within a shared edge, aggregate, cloud, or enterprise context to form a holistic operational or enterprise view is also comprehended.

Results from the edge system 1 1120, edge system 2 1135 and edge system N 1150 processing may be transmitted directly to the cloud storage/processing system 1165 or may be transmitted to through the aggregation layer 1160 where additional cause and effect modeling may take place. Models operating within the aggregation layer 1160 receive inputs and provide effect outputs that are typically at a higher organizational level than those models at the edge level although inputs at any level are comprehended by this invention.

The cloud storage/processing system 1165 is an additional end point for data storage or for data processing. Data analysis operating within the cloud may contain aggregate or enterprise level modeling. The benefits to using a cloud-based layer include network accessibility, pseudo-unlimited data storage limits, and synthesis of disparate data sources.

The enterprise core modeling system 1155 combines sensor and result data from the edge, aggregate, and cloud layers to form a holistic view of an organization or a division thereof. An enterprise level may be appropriate for assigning tasks, allocating resources, or managing supply chains, among other high-level functions. The enterprise core modeling system 1155 can provide results 1170 such as expected failure as a function of time for system 1 1110, system 2 1125 and system N 1140. By using a standardized modeling approach for each system, the outputs can be reliably compared and used to inform enterprise level decisions. In this embodiment, the system with the least remaining time to failure can be prioritized for maintenance tasks before the other systems. Other approaches for managing enterprise level decisions through the aggregation of sensor and cause and effect modeling occurring at multiple organizational and network levels are possible and should also be envisioned by those skilled in the art.

Figure 12:
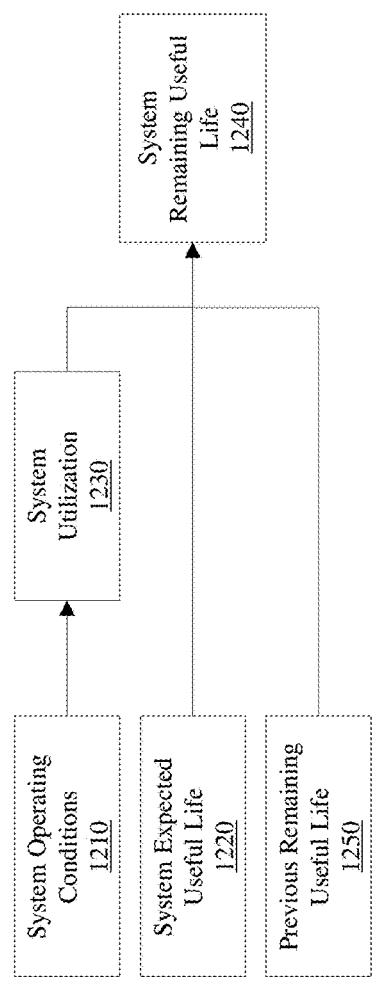
FIGS. 12 and 13 illustrate block diagrams of embodiments of modeling cause and effect processes.
Figure 13:
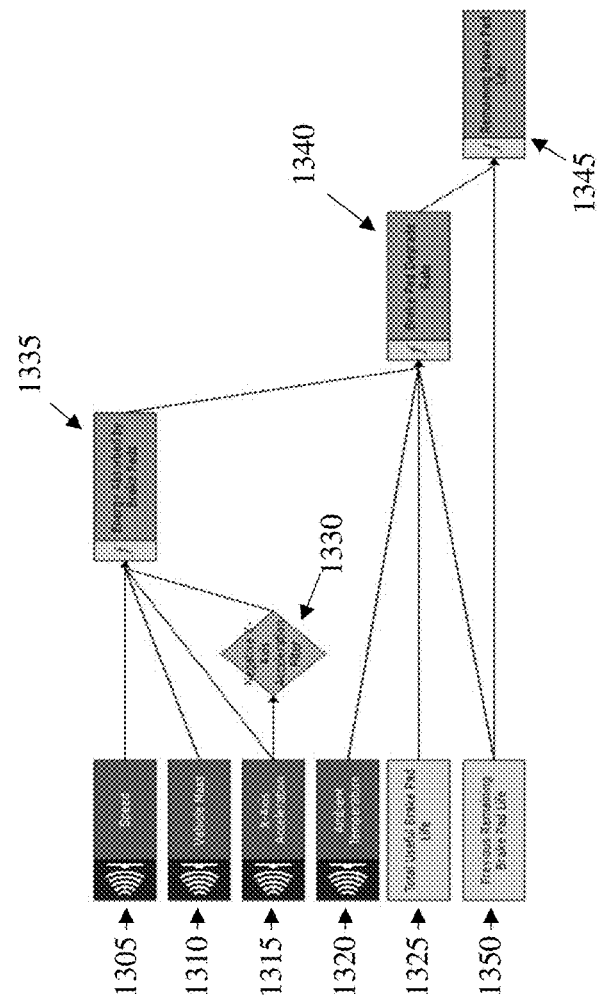

Turning now to FIGS. 12 and 13, illustrated are block diagrams of embodiments of modeling cause and effect processes. FIG. 12 is methodology for calculating the remaining useful life of a system or system component. Other system performance metrics and their relationship to sensor and other data inputs is also comprehended. FIG. 13 demonstrates applying the remaining useful life towards vehicle brake pads.

With respect to FIG. 12, system operating conditions 1210 are the sensor and other input values that represent the real-time or near real-time operational conditions of the system. System expected useful life 1220 is the total usage expected from the system or system component. This rated life expectancy typically has associated operating conditions (i.e., component rated for X hours of use at Y temperature). System utilization 1230 is the quantification of the amount of useful life being consumed based on the current system operating conditions in conjunction with the expected or ideal operation of the system. A definition of system utilization 1230 may include some combination of empirical, physical, or analytical expressions that relate operating conditions to utilization. System remaining useful life 1240 is the current useful life of the system or subsystem through the end of the model evaluation. As time progresses, the calculated system remaining useful life value becomes the input of the model for the next model evaluation as the previous remaining useful life 1250. As operating conditions change, the system utilization 1230 will vary as well; the time history of system remaining useful life 1240 will subsequently reflect this usage rate as a variable slope that updates with each model evaluation. Evaluation rules may be instituted within any element or sub-element to provide insight into model results and trigger preventative or prescriptive notifications. Exemplary evaluation rules may include, but are not limited to, alerts when system operating conditions 1210 are beyond acceptable control limits, alerts when system utilization 1230 is beyond expected nominal operations, or a trend prediction of the date-time at which the system remaining useful life 1240 will reach zero.

With continuing reference to FIG. 12, FIG. 13 demonstrates applying the remaining useful life towards vehicle brake pads, although other approaches for monitoring asset usage, generally, and vehicle brake pads, specifically, are also comprehended. Within this approach, speed 1305, vehicle mass 1310, x-axis acceleration 1315, and ambient temperature 1320 are representative examples of system operating conditions 1210. These are sensor data inputs that are continually updated as the operation of the vehicle changes. The total useful brake pad life 1325 (analogous to the system expected useful life 1220) represents the total energy available for consumption by the brake pad before it is no longer usable. This value may originate from the manufacturer, the operator, from failure testing, or through other means.

A negative x-axis acceleration filter 1330 and energy absorbed by brake pads 1335 represent interim calculation nodes to transform the operational conditions of the vehicle (speed, mass, acceleration) into a calculated estimate of the energy absorbed by the brake pads. This relationship may primarily be based on physics (i.e., energy is proportional to mass multiplied by the square of velocity), but empirical or semi-empirical relationships are also comprehended that relate these sensor parameters with energy absorbed by the brake pads. A brake pad degrade rate 1340 combines the energy absorbed with the ambient temperature 1320 of the vehicle's environment. As the ambient temperature 1320 increases, the wear rate of the brake pad increases for a given amount of energy absorbed. These relationships between sensor data inputs and the brake pad degrade rate 1340 may be through other mathematical functions including different inputs or interim calculations. However, the brake pad degrade rate 1340, remaining brake pad life 1345, and previous remaining brake pad life 1350 are typically consistent elements of a remaining useful life, regardless of the specific approach.

Overall, the benefit of this approach is that the system health and maintenance of a component or subcomponent can be assessed in a real-time fashion and typically, before a failure or negative impact on tangential systems occurs. In this instance, an evaluation filter or other analytical approach may be tied to the remaining brake pad life 1345 to estimate the date-time at which the brake pads expire. This information can then be displayed to the operator, sent to a maintenance system, act as a direct interface to a supply chain system to order a replacement brake pad for example, or used to trigger other preventative or prescriptive actions. As a further example, when applied to the aggregate-level of system modeling described herein, the remaining brake pad life 1345 modeling for an entire fleet of vehicles may be aggregated to enhance maintenance task allocation or supply chain logistics.

Figure 14:
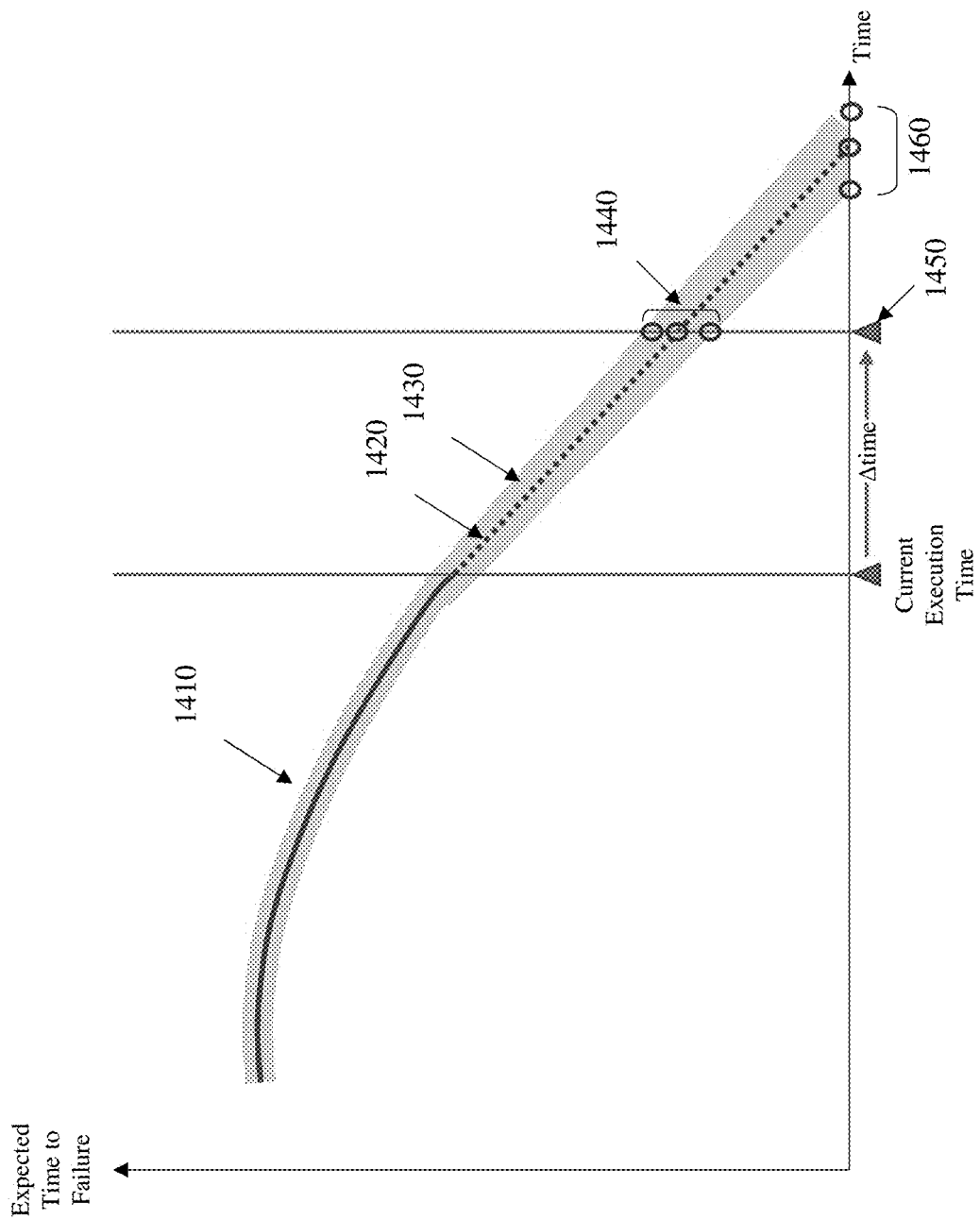
FIG. 14 illustrates a graphical representation demonstrating an embodiment of predictive analysis.

Turning now to FIG. 14, illustrated is a graphical representation demonstrating an embodiment of predictive analysis as applied to an analysis of systems with uncertainty. In the instance shown, an expected time to failure is evaluated as a function of time. The approach provided for predictive analysis comprehends and applies directly to other system performance metrics, interim calculation nodes, or sensor input nodes. A segment depicts a time history (generally designated 1410) of the system performance metric (see also distribution of results 920 of FIG. 9 wherein calculation results are analyzed, stored, and visualized as distributions with associated percentile values).

Up to a current execution time, the time history 1410 is known a priori. The follow on segments and data points are estimates of future system performance based on the historical performance of the system. A segment 1420 represents an estimated value of the expected time to failure from the current evaluation time towards an indeterminate point in the future; this trend line is typically represented by fitting a linear, polynomial, spline, or other curve fitting algorithm to the median value of the distribution of the time history 1410. In a similar manner, other portions of the distribution may be used to create varying trends of the estimated future expected time to failure as indicated by segment 1430. Whereas the segment 1420 typically includes the median value of the distribution of the time history 1410, the segment 1430 may use percentile values from one or both halves of the distribution. The selection of percentile values used to create the segment 1430 is a function of many considerations, such as whether the expected time to failure is expected to increase or decrease at a macro level, or the severity of system outcomes to be expected if the system metric reaches a defined threshold.

The trend line including percentile uncertainty values making up the segments 1420, 1430 are primarily used in two distinct ways, namely, to estimate a range 1440 of the expected time to failure at a defined future point in time 1450, and to estimate the time until the estimated time to failure reaches a defined threshold 1460. Creating the range 1440 includes extrapolating one or more trend lines from the current execution time to some increment in time or towards a fixed date-time in the future. One or more trend lines generated by the segments 1420, 1430 may be used to create a range of estimated time to failure system outcomes within the range 1440. The threshold 1460, conversely, is created by extrapolating one or more trend lines towards a fixed system outcome. In the instance provided for the expected time to failure, this would likely represent zero remaining time to failure or some nominal buffer value above zero, or other thresholds such as upper thresholds for high temperature control limits, are also comprehended.

Figure 15:
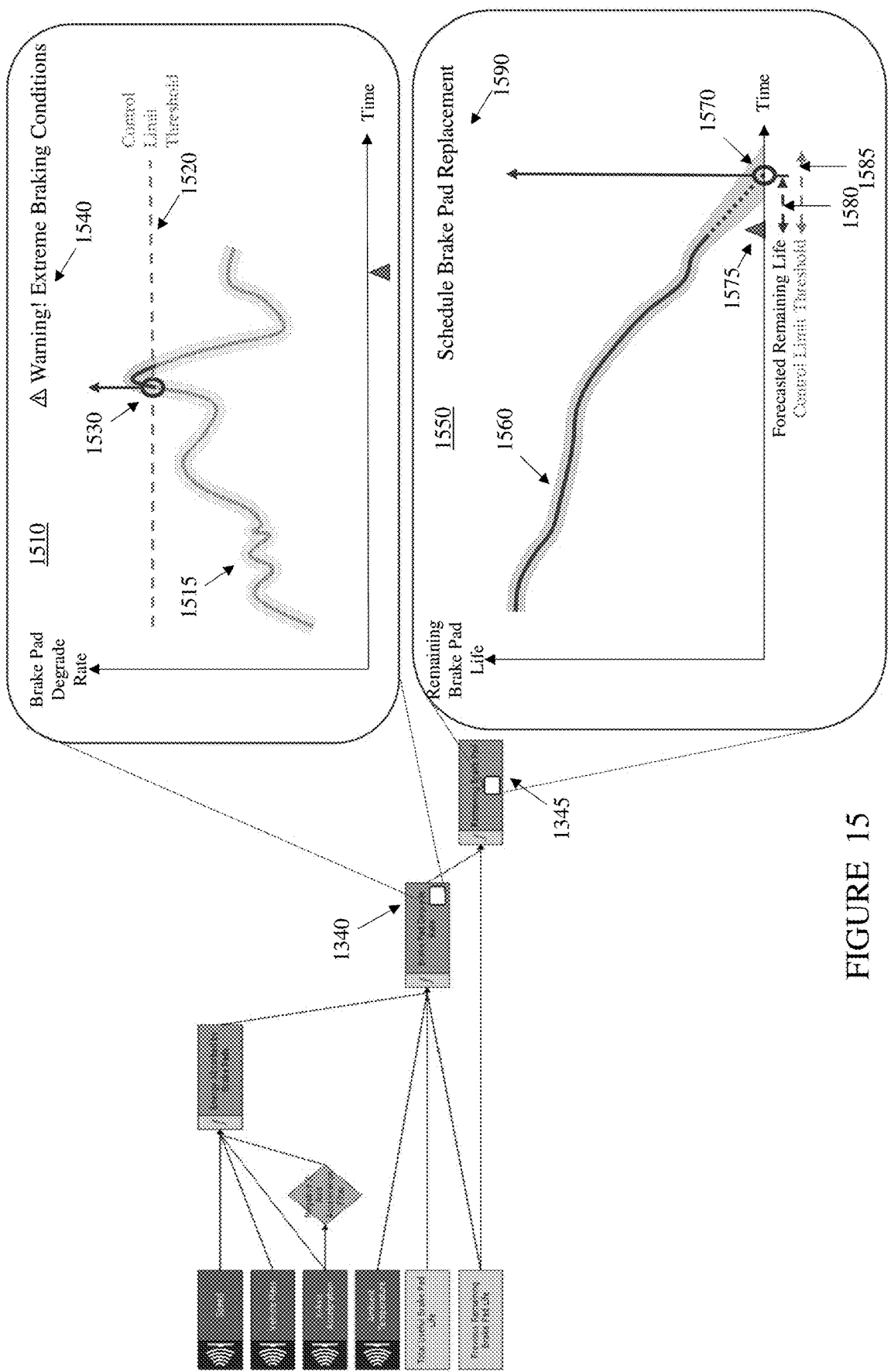
FIG. 15 illustrates graphical representations demonstrating an embodiment of prescriptive action generated from the cause and effect processes of FIG. 13.

Turning now to FIG. 15, illustrated are graphical representations demonstrating an embodiment of prescriptive action generated from the cause and effect processes of FIG. 13. In particular, the graphical representations 1510, 1550 of the prescriptive action of the brake pad degrade rate 1340 and the remaining brake pad life 1345, respectively, are shown in FIG. 15.

The prescriptive action associated with the brake pad degrade rate 1340 is a function of the current utilization rate of the system. As the results of the brake pad degrade rate 1340 vary over time (generally designated 1515), the values are compared to a threshold value 1520. This threshold value 1520 is a known input of the AOS model and may be generated by an asset manufacturer, an operator, through failure testing, or through other means. Thresholds are typically associated with a state in which the system is operating in non-ideal or non-expected conditions. Under circumstances where the results of the brake pad degrade rate 1340 are over the threshold value 1520, a triggering event 1530 occurs. The triggering events 1530 are typically associated when a certain number of trials or percentage of trials from the analysis are over the threshold value 1520. By attaching a non-binary distribution to the threshold value 1520, more actionable results may be expected. In other words, if the triggering events 1530 happened any time one calculation result reached the threshold value 1520, false positives would be expected and, if the triggering events 1530 occurred only if all calculation results reached the threshold value 1520, system degradation or failure may have already occurred. Associated with the triggering event 1530 is a prescriptive action message 1540, that is specific to the node and the threshold state being triggered. The mode of communicating the prescriptive action message 1540 may be through local display, text message, email, or other standardized data communication protocol. It is also envisioned that some triggering events 1530 may directly interface within the system controls 240 (see FIG. 2).

The prescriptive action associated with the results of the remaining brake pad life 1345 is a function of the forecasted trend of remaining useful life of the system. As the results for the remaining brake pad life 1345 degrade over time (generally designated 1560), it approaches a lower threshold 1570 for safe operation or replacement, nominally depicted as zero remaining useful life. At the current evaluation time 1575 of the AOS model, the historical results are used to create a forward-looking trend (or forecasted remaining life) 1580. This trend line is then used to intersect the lower threshold 1570 to calculate the time remaining until the threshold 1570 is crossed. It should be noted that if the system is being operated in a consistent and nominal condition, the remaining brake pad life 1345 and the forecasted remaining life 1580 should be consistent. However, when the system is being operated beyond nominal conditions (i.e., brake pad degrade rate 1340 is greater than expected and/or is increasing over time), the forecasted remaining life 1580 may be significantly different from the calculated remaining brake pad life 1345. In order for the predictive threshold crossing to generate a prescriptive notification action, the forecasted remaining life 1580 needs to be less than a control limit threshold 1585. This ensures that notifications are only generated when the prescriptive action is on an actionable timescale. The control limit threshold 1585 is a user-defined setting of an AOS model and should take into account the time variability of the associated calculation node, the severity of system performance outcome upon reaching the defined threshold, and lead time in assigning and executing prescriptive actions, among other considerations. Although only illustrated with a single point of the trend line distribution, it is also comprehended that multiple trend lines from different portions of the forecasted distribution (such as that shown previously in the defined threshold 1460 of FIG. 14) may be combined to trigger prescriptive actions. A prescriptive action message 1590 is generated to schedule brake pad replacement.

These illustrative examples, for ease of explanation, referred to specific examples of cause and effect processes, predictive analysis and prescriptive action. However, it is to be understood that these are only illustrative examples, and this invention comprehends and includes the generalized concepts.

Figure 16:
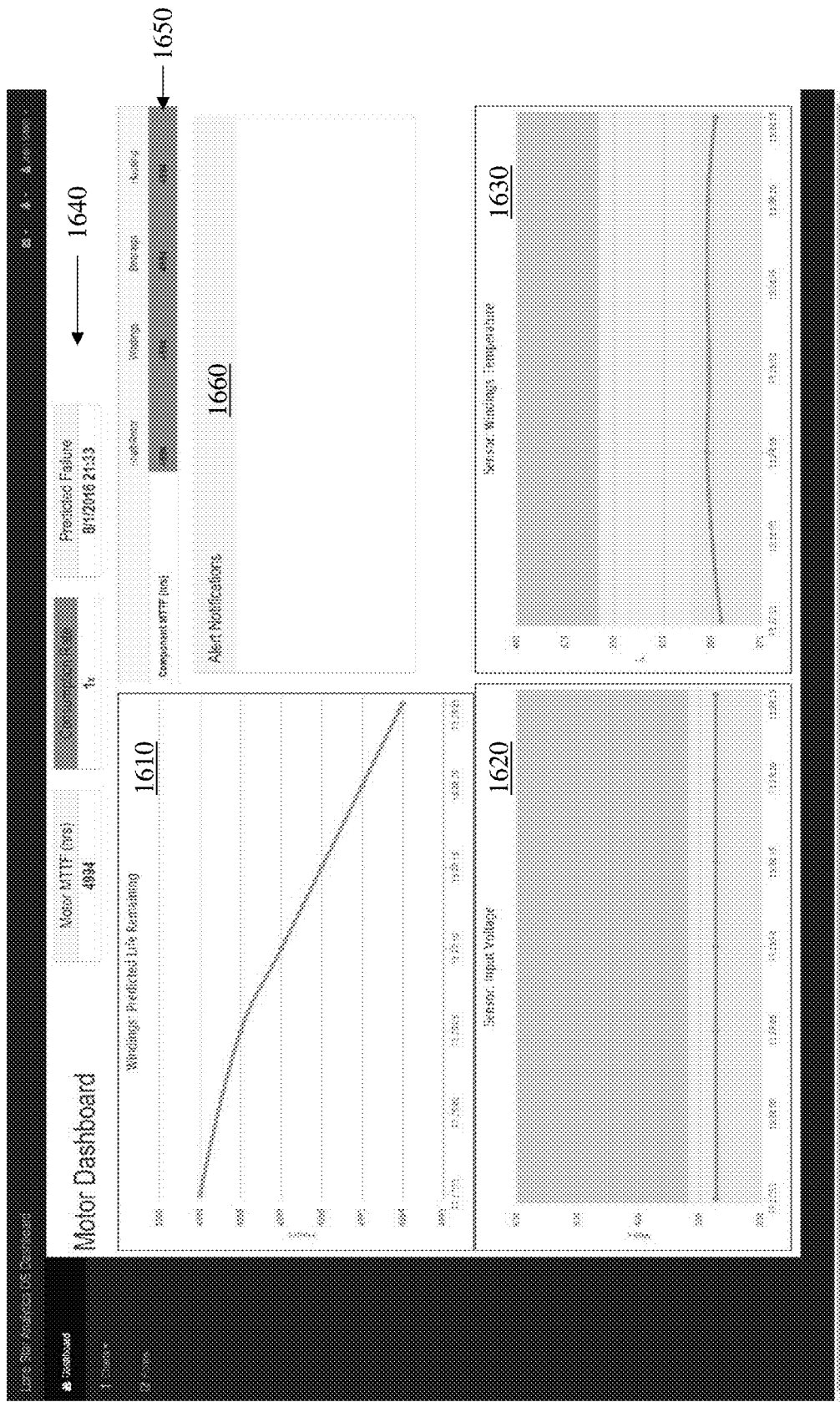
FIG. 16 illustrates a screen shot of an embodiment of a dashboard associated with a model for a cause and effect.

Turning now to FIG. 16, illustrated is a screen shot of an embodiment of a dashboard associated with a model for a cause and effect. The dashboard visualizes multiple calculation node results along with alert notifications that reflect the real-time or near real-time operation of the system. The dashboard includes a time history window 1610 of a calculation node and sensor windows 1620, 1630 associated with calculation nodes or system performance metrics. A current results window 1640 provides the latest values for selected results, which may be depicted by their full distribution or by a specific percentile value, or through some other means of communicating the system's current state. A field 1650 depicts the remaining useful life of several subcomponents of the system with associated color coding for subcomponent degrade rate. In this way, interim calculations may be summarized to provide graphical ques that further inform the overall system status. Alert notifications are displayed within an alert window 1660. Notifications may be available for inspection from the current evaluation or from previous model evaluations. The end-user shall have the capability to sort and filter notifications based on the component, subcomponent, prescriptive action, and other identifying characteristics of the notification action.

The dashboard summarizes the model results of one system, however, it is comprehended that a user-interface may also exist at the aggregate, cloud and enterprise levels that synthesize sensor input and other calculation results from a multitude of systems. Also, it is comprehended that this interface be fully user defined and constructed in a graphical user interface ("GUI") format for various elements. In this way, results and notifications from systems, multiple systems and aggregated systems can be viewed within a shared dashboard.

Turning now to FIGS. 17 to 19, illustrated are graphical representations demonstrating approaches for managing and analyzing stochastic variables. FIG. 17 illustrates an exemplary general approach to stochastic variables. FIG. 18 illustrates diagnostics as applied to stochastic variables. FIG. 19 illustrates time-dependent filters as applied to stochastic variables.

FIG. 17 depicts a time varying history 1705 of a calculation node (or variable) within the cause and effect model including median and other percentile characteristics of the variable (see, e.g., FIG. 9). FIG. 17 also depicts a curve 1710 of a probability that the variable will be a certain value at a point in time 1715. As the curve 1710 shifts upward the corresponding value on the x-axis has a higher probability of occurring. This graphic representation is often referred to as a probability density function. As opposed to academic descriptions of probability distributions that continue to positive and negative infinity, the curve 1710 has finite endpoints characterized by the sensed and other data that impacts the calculation of the current variable. Other approaches to visualizing and describing stochastic data such as candlestick charts, uncertainty bands, among others, are also comprehended.

Whereas the curve 1710 depicts the singular probability of a specific value, FIG. 17 also depicts a curve 1720 of a cumulative probability of being above or below a specific value. As the curve 1720 increases from bottom left to top right, the cumulative probability goes from a value of 0 to a value of 100. This signifies that below the intersection of the curve 1720 with the y-axis, there is a 0 percent (%) probability that the variable is less than the intersected value. At any point along the on the curve 1720, the cumulative probability can be used to characterize the stochastic results of the calculation. For example, the value corresponding to a cumulative probability of 40% has a 40% chance of being lower and a 60% chance of being above the corresponding value on the y-axis. This approach is referred to as an inverse cumulative density function, a quantile function, or a percent point function. Other approaches for visualizing and describing cumulative probability of stochastic variables is also comprehended.

FIG. 18 reuses the same core elements of FIG. 17, but applies diagnostic analysis to determine the state of the underlying system. At the time 1715, the time varying history 1705 of the calculation node is compared to a lower control limit threshold 1810 that is a pre-determined specification of the system or subsystem health. For the lower control limit threshold 1810, this would be stated as "if more than X % of the distribution is lower than threshold, the system health is degraded." Although FIG. 18 illustrates a lower control limit threshold, upper thresholds, bounded thresholds, dynamic thresholds and other constraining criteria are also comprehended.

A curve 1820 of FIG. 18 illustrates a probability distribution of the variable, which is overlaid with diagnostic rules to determine system health. The cumulative portion of the distribution or curve 1820 below a threshold 1830 is then compared to the rule to determine system status. If the rule is satisfied, the system is determined to be in that state. The benefits of applying diagnostics stochastically as opposed to deterministically common current implementations, are the reduced rate of false positives from low probability crossing of control thresholds, among others.

A curve 1840 of FIG. 18 illustrates an inverse cumulative probability distribution of the variable value. For state diagnostics, cumulative probability is an exemplary approach for characteristic stochastic states. Using the same threshold value 1830, the portion of the distribution or curve 1840 therebelow can be identified. This corresponds to a cumulative probability that the sensor or model calculation is below the threshold. If this probability is beyond the diagnostic rule put in place, then the system is degraded. Diagnostic thresholds that characterize normal operating conditions, beneficial system operation, upper control thresholds, and other system statuses are comprehended. Diagnostic rules are defined by the model architect, system operator, system manager, system manufacturer, through machine learning or artificial intelligence algorithms, or other manual or automated approaches.

FIG. 19 reuses the same core elements of FIG. 17, but demonstrates a stochastic variation of the time varying history 1705 of a calculation node (or variable) by applying time-varying filters to provide a filtered distribution 1910. The purpose of a stochastic filter is to process underlying noise in the sensor or calculated node to arrive at a more stable estimate of the system. Such a filter approach may use a portion or the entirety of the time varying history 1705 from any historical segment before the time 1715. This filtered distribution 1910 may be generated through Kalman filtering techniques (consisting of at least one state), moving average techniques, polynomial curve fitting, or other applicable curve fitting techniques. Also comprehended is the application of forward-looking forecasts (see, e.g., FIG. 12) to the filtered distribution to determine an estimated time to cross a defined threshold.

Figure 20:
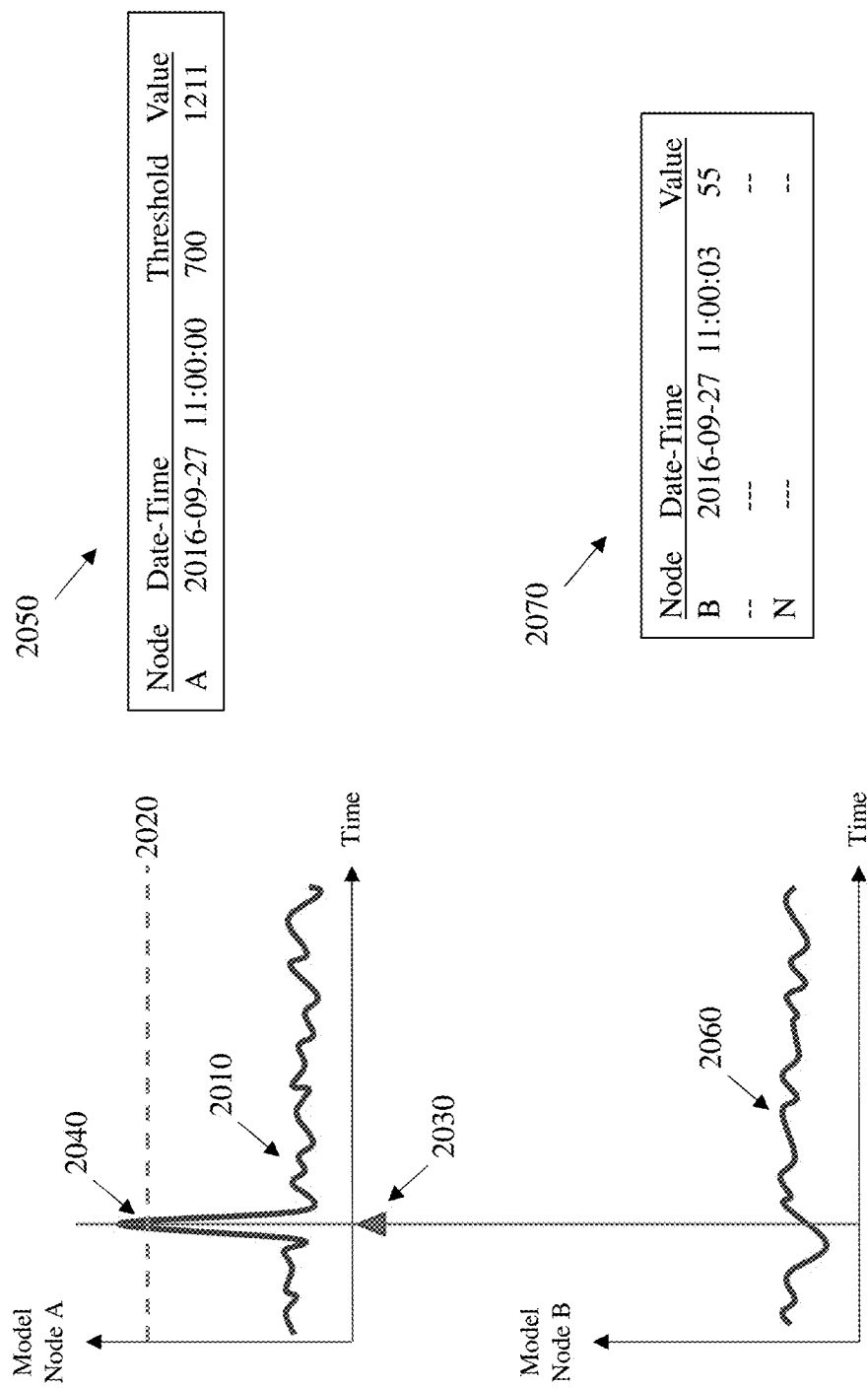
FIG. 20 illustrates graphical representations of an embodiment of identifying rare high-impact system events.

Turning now to FIG. 20, illustrated are graphical representations of an embodiment of identifying rare high-impact system events. Within the operation of a system, there exist some conditions that may disproportionately affect system performance outcomes. These events are sometimes referred to as Black Swan events. Black Swan events rarely occur, but when they do may have a substantial impact on system performance. It is, therefore, important that Black Swan events be monitored in systems where the cost incurred by their occurrence is also high.

A time varying history 2010 of a calculation node A (or variable) is illustrated with a Black Swan threshold 2020 from previous observation, estimated calculation, or other means that when the underlying variable crosses, the system performance experiences a significant change. At a time 2030, the system characteristic crosses the threshold 2020 for a segment 2040. At this same time, a log 2050 is initiated that characterizes the time and magnitude of the offending Black Swan event. The contents of the log 2050 are shown in an exemplary format and may contain other information about the contents of the variable and its distribution.

A time varying history 2060 of a calculation node B (or variable) is illustrated, but which is not necessarily linked to the Black Swan threshold 2020. Although only one additional variable B is shown, a multitude of other system characteristics are comprehended. The realized values of the calculations concurrent to the offending characteristic at time 2030 are also provided in a log 2070 for the variable B and others. Concurrent calculations are additionally recorded so that the root cause of the Black Swan event may be more easily understood by considering broad multivariate, environmental, global or other effects.

The logs 2050, 2070, along with prescriptive actions, may be stored locally for further investigation, sent to a networked or cloud system for further investigation, sent via a messaging protocol such as email, short messaging service ("SMS"), or MQTT to system operators, or otherwise communicated to human or computer systems. Additionally, the instance of a Black Swan event may trigger manual or automatic action by the system controls or human operators that manage system controls.

Figures 21, 22:
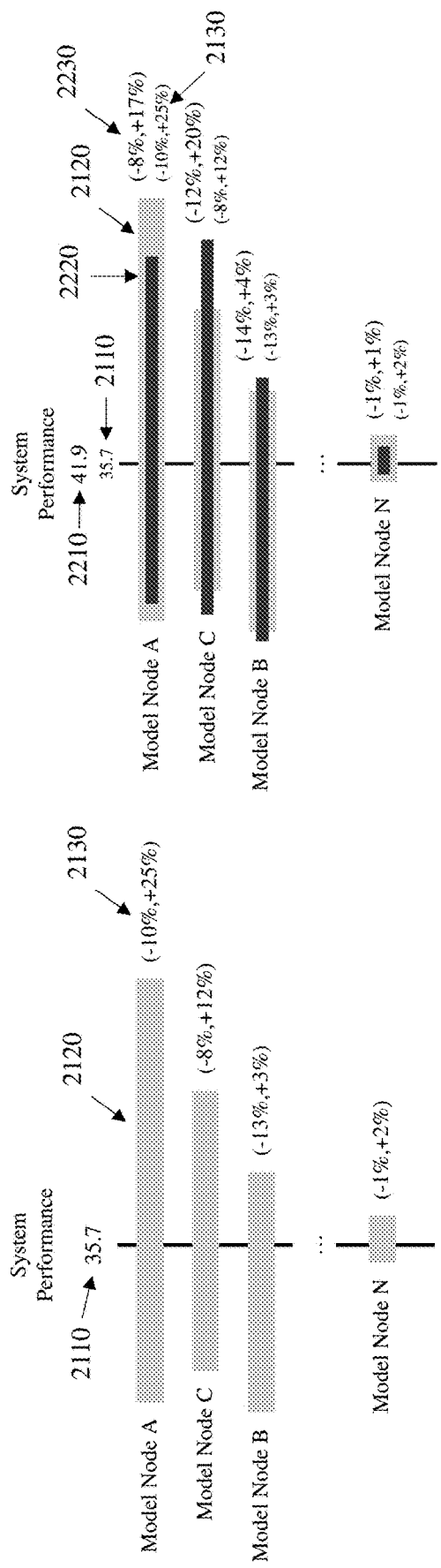
FIGS. 21 and 22 illustrate graphical representations of embodiments for displaying and interacting with stochastic causal influencers.

Turning now to FIGS. 21 and 22, illustrated are graphical representations of embodiments for displaying and interacting with stochastic causal influencers. FIG. 21 illustrates stochastic calculations impacting a system performance output. FIG. 22 illustrates a variation in calculation influencers for both a current evaluation as well as for a historical time set.

In FIG. 21, the system performance is a function of one or more previous nodal models (designated Model Node A, B, C, . . . , N). These models may be direct influencers or may be several calculation steps removed from the selected system performance output. The output value of a selected node may be summarized by one or more point of its stochastic distribution 2110. For each influencing calculation node, its impact (a historical variance 2120) on the variance of the system performance is shown with a potential high and/or low impact (designated 2130). The larger the bar, the more uncertainty in the system performance is driven by an underlying node (such as Model Node A). Although a causal calculation node may have substantial uncertainty, its relationship to the effect calculation node may have little impact. Conversely, a highly influential cause may have a large impact on downstream calculations even with small variances.

In FIG. 22, the framework of FIG. 21 is applied to compare the current impact of variance to historical or nominal values. A system performance is described by its value at a current point in time 2210 and during some past time interval 2110. This time interval may be fixed, dynamic, or set by other means. For each influencing calculation node (designated Model Node A, B, C, . . . , N), the historical variance 2120 is overlaid with the current variance 2220. The potential high and low impacts are displayed for historical values (designated 2130) and current values (designated 2230). Where the current variance 2220 surpasses the historical variance 2120, process or system instability may be identified. The benefit of approaches shown in FIGS. 21 and 22 are the ability to drill down to understand the cause of anomalies, changes in system performance, and other variations. Although shown for system performance outputs, it is also comprehended to explore and visualize variance in other model upstream calculation nodes.

Figures 23, 24:
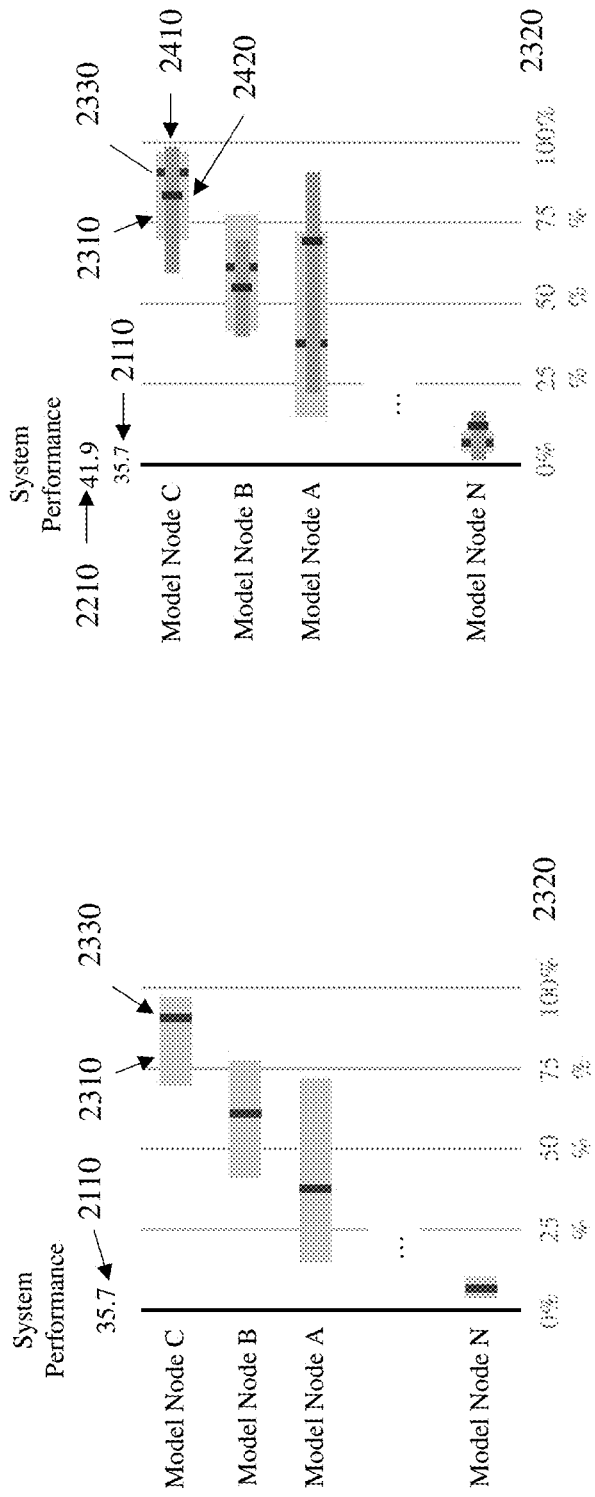
FIGS. 23 and 24 illustrate graphical representations of embodiments for displaying a magnitude of stochastic causal influencers.

Turning now to FIGS. 23 and 24, illustrated are graphical representations of embodiments for displaying a magnitude of stochastic causal influencers. FIG. 23 illustrates the most impactful factors effecting a system performance calculation. FIG. 24 illustrates the current drivers of system performance as compared to historical or nominal levels of impact. Whereas FIGS. 21 and 22 depict the impact of variance in underlying causes, FIGS. 23 and 24 depict the relative magnitude of the underlying impacts. A highly weighted influence may have little variation and would therefore show more prominently within the confines of FIGS. 23 and 24. It is comprehended that these visualization layers describing current, historical, and forecasted system state may be integrated within a common user interface. The ability to drill down to investigate stochastic variance and magnitude impacts may be a sub-detail of a component, system, enterprise, or other higher level user interface. Like values, variables or nodes from FIGS. 21 and 22 are also designated herein.

In FIG. 23, the system performance is displayed as function of one or more previous calculation nodes (designated Model Node A, B, C, . . . , N). The placement of graphic bars (one of which is designated 2310) along an axis 2320 corresponds to the relative magnitude of the historical influence of the underlying calculation node (such as Model Node C). A median value (one of which is designated 2330) or other value from the stochastic distribution may be used to illustrate the variance of a calculation node (such as Model Node C). Although the calculation nodes listed lower within the influencing node hierarchy may have larger bars (i.e., have larger variance), their impact may still be secondary to other influencers. For example, when monitoring the output of an electric motor, ambient temperature may have large variance and have some level of impact on power output. However, incoming current to the system may have a much larger impact, even if the value is relatively constant.

In FIG. 24, the system performance is shown for the current point in time 2210 as compared to a historical time set or nominal value 2110. For each influencing calculation node (designated Model Node A, B, C, . . . , N), the historical magnitude 2310 is overlaid with a current magnitude 2410 (for Model Node C). The display of each value may be made up of one or more values from a stochastic distribution 2420 or through other means of communicating variance in sensor or calculated data. By comparing current magnitude of influence to historical norms, outliers may be identified for root cause analysis to narrow prescriptive action. Other means of displaying hierarchical stochastic data such as candlestick charts, stock graphs, whisker plots, contour maps, and other such visualization techniques are also comprehended.

Figure 25:
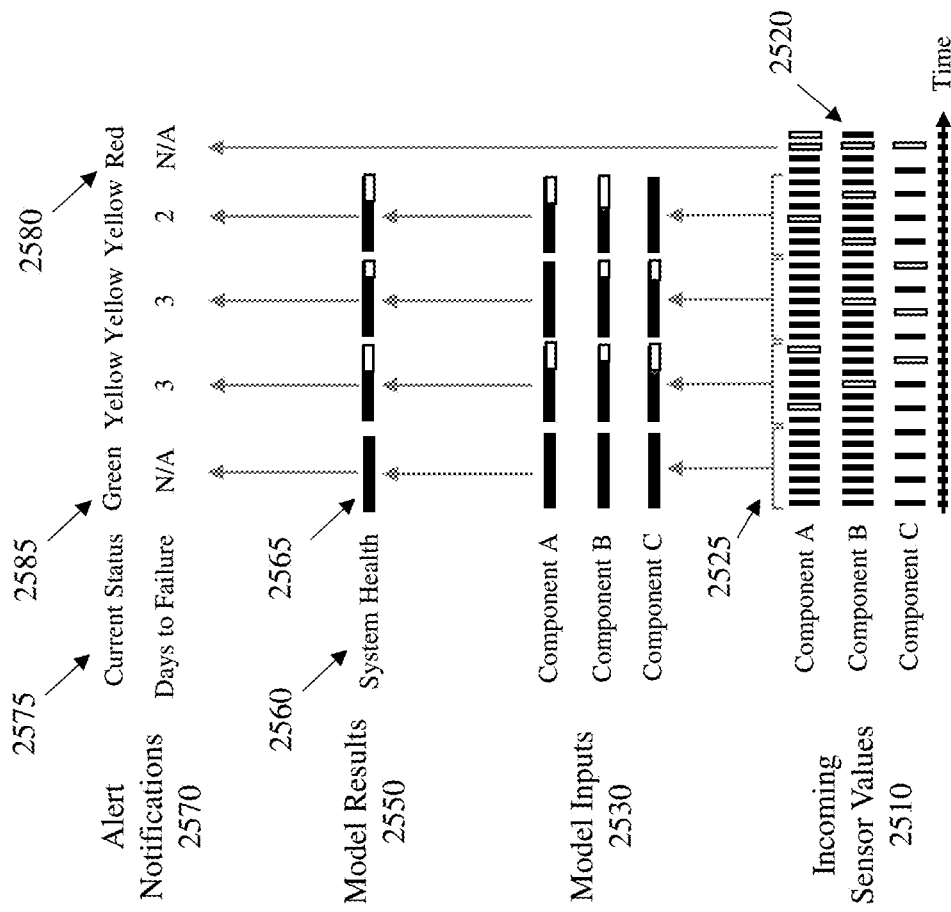
FIG. 25 illustrates a graphical representation demonstrating a presentation of information for a cause and effect analysis.

Turning now to FIG. 25, illustrated is a graphical representation demonstrating a presentation of information for a cause and effect analysis. The information includes sensor or other input values 2510, data prepared for consumption for stochastic modeling 2530, system performance outputs calculated by a stochastic cause and effect model 2550, and prescribed alert notifications 2570.

The incoming sensor values 2510 include sensor readings, human inputs, computer inputs, or other sources of input that describe the system or some characteristic that impacts the operation of the system. At some regular or irregular interval of time, these inputs are updated in time to reflect their current status 2520. For this example, the statuses of the system's components are denoted by a green mark (solid black in FIG. 25) for acceptable conditions and red mark (outlined in black in FIG. 25) for degraded conditions. It should be noted that the frequency with which the sensor values 2510 are refreshed is variable between components, as may be expected in practical installation scenarios.

At a predefined time interval 2520, incoming sensor values 2510 are batched and processed within a stochastic cause and effect model (see, e.g., FIG. 10). The model inputs 2530 describe, as a stochastic distribution, the status of each system component for the current time interval 2525.

From these model inputs 2530, model results 2550 are calculated from the stochastic cause and effect model (see, e.g., FIG. 13). These model results 2550 may include overall system health or other system output performance metrics 2560. The stochastic results 2565 combine the influencing model inputs of the components which impact system health.

The model results 2550 are then passed to a communication layer in the form of alert notifications 2570. This may include multiple forms of information such as a current health and operational status 2575 of the system and the forecasted time to reach a defined state or threshold. The alert notifications 2570 may, among other actions, simply reflect the status of the system or may prescribe action (or inaction) to human or computer control operators. Also comprehended is the direct communication of system status when sensor input values 2510 violate Black Swan type rule criteria (red system status) 2580. It is also comprehended that the mode, frequency, or other characteristic of communication means may vary depending on the severity of the system status. For instance, a green system status 2585 may only trigger a local system light with no outside communication, whereas a red system status 2580 may send a prescriptive message to operators and request the system to shut down.

The overall impact of implementing the system is depicted in the consolidation of incoming sensor values 2510 to actionable information via the alert notifications 2570. Whereas current enterprise and cloud-based solutions may send all sensed and input values to data centers to analyze system performance, the proposed system may perform a majority of analysis at the edge before communicating the status of the system to operators, control systems, or some higher data analysis layer. This approach has several benefits including, but not limited to, reduction in the network connectivity of installed systems, reduction in real-time multi-system analytics away from the point of installation, reduction in data storage away from the point of installation, reduction in the frequency and payload of incoming data describing system status, and focused predictive and prescriptive action that can be aggregated between one or more systems.

Turning now to FIG. 26, illustrated is a flow diagram of an embodiment of a method of operating a communication system. The method provides predictive and prescriptive analytics for a system running at an edge (e.g., proximal to the system). The method begins at start step or module 2610. At a step or module 2620, the method includes building, testing and deploying a model based on sensor characteristics of the system (e.g., within an architect subsystem 110 including a processor and memory, see FIG. 1). The sensor characteristics may be derived from an operator input, a historical input, a specification input, and/or a subject-matter expert input. The method also includes performing predictive and prescriptive analytics on sensor data from the system running on the model deployed at the edge (e.g., within an edge subsystem 120 including a processor and memory, see FIG. 1) at a step or module 2630.

The predictive and prescriptive analytics may be performed on at least a component of the system based on the sensor data. The predictive analytics may include an estimate of an operation (e.g., a health and remaining life) of a component of the system associated with the sensor. The prescriptive analytics may include a future action on a component of the system associated with the sensor. The prescriptive analytics may be based on a threshold performance of a component of the system associated with the sensor.

At a step or module 2640, the method includes providing results and notifications based on the predictive and prescriptive analytics (e.g., from the edge subsystem 120). In accordance therewith, the results may include providing a current status of a component of the system associated with the sensor (e.g., from the edge subsystem 120).). In accordance therewith, the results may include determining a characteristic of the system based on the sensor data from a plurality of sensors. Thus, the sensor data may allow for the calculation of another characteristic associated with the system. At a decisional step or module 2650, it is determined if the method should be repeated. If the method should be repeated, the method returns to the step or module 2620, otherwise the method ends at a stop step or module 2660.

The following provides an interface between data applications and the AOS software platform. As a non-limiting example, the specification follows the MQTT 3.1.1 standard published by the Organization for Advancement of Structured Information Standards ("OASIS"), which is incorporated herein by reference.

The data messages that interface with the AOS system may include a topic name, and data payload. (See TABLE 2.) Details on the technical means of data transportation can be found in the OASIS MQTT standards document (OASIS Standard, MQTT Version 3.1.1, Oct. 29, 2014, and open-source MQTT libraries such as Eclipse Paho, which are incorporated herein by reference).

TABLE 2

| Field | Data Format | Comment |
| --- | --- | --- |
| Sensor_Topic | Variable Character | Unique name required for each data source |
| Payload | JavaScript Object Notation ("JSON") String | Data value including any metadata |

The sensor topic and payload protocols are differentiated between MQTT messages coming inbound to the AOS system and MQTT messages being published outbound therefrom.

The sensor topic declares a unique identifier for each source of data. The sensor topic names may be case sensitive. It is suggested that the topic names be uppercase and underscores used in the place of spaces. It is also suggested, but not required, that topic names be in the following format, namely, Location of System/Major Component/Subcomponent/Measured Variable. Other naming conventions may be employed for sensor topics, such as using identification ("ID") strings generated by the data source application or intermediate data handling layer. The uniqueness of a sensor topic is the only overarching requirement. The sensor topic should also be known by the AOS model developers before the deployment of the model.

A description of the components and subcomponents can be eliminated or expanded as dictated by the complexity of the sensor-system integration. That is, if a system does not have any subcomponents, the sensor topic name may only specify the major system. Conversely, if a system has several layers of complexity, additional subcomponent tags can be added to the sensor topic name. The sensor topic names should not begin with a forward slash.

In the case of multiple systems of the same type being published to the same AOS data subscriber, clarifiers should be added in the level of the system in which they are differentiated (e.g., SITE_1/MOTORA/WINDING/TEMPERATURE, and SITE_1/MOTORB/WINDING/TEMPERATURE for two motors operating in the same environment). Where possible, consistency should be used in subcomponent and variable naming conventions.

MQTT payload packages are bundled as JSON objects. The entire payload should be encompassed within brackets { }. In general, the payload is structured as a clarifier title followed by a colon and the value of that clarifier. The clarifier titles are enclosed within double quotes. Commas separate multiple clarifier packages within a payload. Values are presented within double quotes if they contain string values and without double quotes if they are a numeric value (i.e., "CLARIFIER_1": "Text_value", "CLARIFIER_2": 7).

The data value is an object class within the JSON payload. The data values should be presented as character strings with the universal clarifier "DATA" followed by a colon (e.g., Sensor_Topic {"DATA": XXX}). For numeric values, scientific notation may be used with the value of "e" separating the exponential factor (e.g., 1000=1.000e3=1e3).

The following properties may be published within an MQTT message, but are not required for AOS operation. These include metadata that describe the context of the MQTT message. All additional JSON objects within the payload should be separated by a comma and contain their clarifier, followed by a colon and the value of that clarifier. Other optional clarifiers not specified below may also be specified using the same format, but the receiving MQTT broker should be configured to interpret the additional metadata. There is no requirement for the order of clarifiers, including the primary DATA clarifier.

If available for configuration within the source publishing application, it is suggested that the JSON package include the sensor topic with the "TOPIC" clarifier. Replicating the entire MQTT sensor topic name within the payload allows for more efficient parsing and allocation of data. Timestamp messages contain the date and time of the occurrence being measured. In order to define a timestamp, use the clarifier "TIMESTAMP" following the data value as an integer (i.e., MOTORA/WINDING/TEMPERATURE {"DATA": 50, "TIMESTAMP": 1473269535670}). The timestamp values should be specified in the Julian milliseconds since Jan. 1, 1970 00:00:00 Universal Time Coordinated ("UTC") standard. The units of the sensor topic may be optionally specified by a separate MQTT clarifier "UNITS." The units are not required for designation within AOS system, but should be known when configuring an MQTT-to-AOS interface.

The MQTT messages should be published on a one-by-one basis as they are received and processed by a data hub. Separate publications should be made for each sensor topic, even if the time of receipt is the same or if multiple sensor values from the same sensor topic have accumulated. It is not necessary for topics to be published at a consistent time interval, even within one sensor topic. The AOS MQTT data broker is capable of aggregating and analyzing asynchronous data. The data values may be published through MQTT messages when a new value has been generated by a sensor reading or other means.

The following details MQTT messages that are generated by the AOS system during model evaluation. At a high-level, outbound MQTT packages are differentiated by results and notifications. The results are segmented by their functionality with respect to the modeling process (i.e., triggers on incoming sensor data, interim model calculations, filtered result trends). The notifications are formatted outputs meant to be directly ingested by computer systems or operators with minimal additional analysis and are sent when further action is suggested. The notifications also have built-in settings that restrict the frequency with which alarms are sent (i.e., notification of system operating out-of-bounds may be sent once an hour, while the results may provide an out-of-bounds value every five seconds when the model evaluates). In general, the format of both types of MQTT messages follows the topic-JSON payload format specified above for incoming MQTT messages.

Within an AOS model, each calculation step is referred to as a "node." The node name describes both the system being analyzed and a description of the parameter being calculated. Within an AOS model, node names are unique. Any node can be flagged for export during the model definition process. Subscription to raw calculation results is suggested as a data backup, or if higher-level system analysis is required. The results of the calculation are saved in a stochastic summary format with the below values available as set forth in TABLE 4.

TABLE 4

| Node Result Field | JSON Tag | Data Format | Description |
| --- | --- | --- | --- |
| Model Name | model | Variable Character | Title of the AOS model - declares the system and location being analyzed |
| Node Name | node | Variable Character | Calculation title within the AOS model |
| Evaluation Start Timestamp | timestamp_evaluation_start | Date-time | Time defined by the start of the current evaluation window |
| Evaluation End Timestamp | timestamp_evaluation_end | Date-time | Time defined by the end of the current evaluation window |
| Low Bound | result_min | Double Precision | Minimum calculated result value |
| $10^{th}$ Percentile | result_10 | Double Precision | $10^{th}$ percentile calculated result value |
| $30^{th}$ Percentile | result_30 | Double Precision | $30^{th}$ percentile calculated result value |
| $50^{th}$ Percentile | result_50 | Double Precision | $50^{th}$ percentile calculated result value (median) |
| $70^{th}$ Percentile | result_70 | Double Precision | $70^{th}$ percentile calculated result value |
| $90^{th}$ Percentile | result_90 | Double Precision | $90^{th}$ percentile calculated result value |
| High Bound | result_max | Double Precision | Maximum calculated result value |

The following TABLE 3 shows separate MQTT messages published by the data hub incoming to the AOS system detailing the operating conditions of Motor A and Motor B at processing Plant 533.

TABLE 3

```
    -> PLANT_533/MOTORA/WINDING/TEMPERATURE {
"DATA":   34.257, "TIMESTAMP": 1473264435670}
    -> PLANT_533/MOTORB/WINDING/TEMPERATURE {
"TOPIC": "PLANT_533/MOTORB/WINDING/TEMPERATURE",
"DATA": 50, "UNITS": "K"}
    -> PLANT_533/MOTORA/HOUSING/TEMPERATURE {
"DATA":   100, "TIMESTAMP": 1473264535670}
    -> PLANT_533/MOTORB/HOUSING/HUMIDITY {
"DATA": 40, "UNITS": "%", "TIMESTAMP": 1473264635670}
```

The node result MQTT messages may be subscribed to with the topic of aos/results/results summary.

"Black Swan" refers to extreme outliers that drive adverse effects within a system. The Black Swan rules may be placed on any incoming sensor node within an AOS model. When a Black Swan rule is tripped within execution of a model, the AOS system captures the offending sensor value concurrent value of all other incoming sensor values for further inspection. In this way, the Black Swan rules allow forensic investigation of highly focused events that may otherwise not be captured by other means. The below fields in TABLES 5 and 6 are associated with a Black Swan rule.

TABLE 5

| Black Swan Result Field | JSON Tag | Data Format | Description |
|---|---|---|---|
| Model Name | model | Variable Character | Title of the AOS model - declares the system and location being analyzed |
| Node Name | node | Variable Character | Calculation title within the AOS model |
| Topic | topic | Variable Character | Topic identifier of the incoming sensor source |
| Output Type | output_type | Variable Character | Declaration of the JSON package type (blackswan_result) |
| Evaluation Start Timestamp | timestamp_evaluation_start | Date-time | Time defined by the start of the current evaluation window |
| Evaluation End Timestamp | timestamp_evaluation_end | Date-time | Time defined by the end of the current evaluation window |
| Rule Set | rule_name | Variable Character | Description of the class of rules being monitored on the AOS sensor node |
| Output Value | rule_output | Double Precision | Output state used to differentiate multiple Black Swan rules |
| Rule Summary | rule_summary | Variable Character | Human readable summary of the inequality expression governing the Black Swan rule |
| Rule Left Side Value | rule_left_value | Double Precision | First value in the Black Swan inequality |
| Rule Left Inclusive | rule_left_inclusive | True/False | Boolean statement of whether the inequality is inclusive of the left side value |
| Rule Right Side Value | rule_right_value | Double Precision | Second value in the Black Swan inequality |
| Rule Right Inclusive | rule_right_inclusive | True/False | Boolean statement of whether the inequality is inclusive of the right side value |
| Value | result_value | Double Precision | Sensor value which triggered the Black Swan rule |
| Sensor Timestamp | result_value_sensor_timestamp | Date-time | Time at which the sensor read occurred |
| Sensor Black Swan Count | result_sensor_data_range_count | Integer | Number of data points of the offending sensor in the black swan range |
| Sensor Total Data Count | result_sensor_data_count | Integer | Total number of data points of the offending sensor in the evaluation window |
| Black Swan Triggered Percentage | result_sensor_data_range_percentage | Double Precision | Percentage of sensor data value during this evaluation window that matched the Black Swan criteria |
| Message | rule_message | Variable Character | Human readable explanation of the Black Swan occurrence |
| Concurrent Sensors | concurrent_sensors | JSON | List of other sensors and their values at the time of offending sensor read |

TABLE 6

| Black Swan Concurrent Sensor Nested JSON field | JSON Tag | Data Format | Description |
|---|---|---|---|
| Node Name | node | Variable Character | Calculation title within the AOS model |

TABLE 6-continued

| Black Swan Concurrent Sensor Nested JSON field | JSON Tag | Data Format | Description |
|---|---|---|---|
| Topic | topic | Variable Character | Topic identifier of the incoming sensor source |
| Topic | topic | Variable Character | Topic identifier of the incoming sensor source |
| Value | result_value | Double Precision | Sensor value of the concurrent sensor at the time the offending sensor triggered the Black Swan rule |
| Sensor Timestamp | result_value_sensor_timestamp | Date-time | Time at which the sensor read occurred |

Black Swan result MQTT messages may be subscribed to with the topic of aos/results/black_swan.

The majority of the Black Swan JSON payload is standard to the above payload format. However, the concurrent sensor values are a nested payload such that each sensor topic has its own JSON payload. Therefore, the size of the concurrent sensors payload will be dynamic, depending on the total number of sensors within the AOS model, but the format will be consistent. Since this payload is a nested JSON structure, the entire list of concurrent sensors will be encapsulated by square brackets [ ]. Each sensor set JSON sub-payload is contained with regular brackets { } and separated by commas. An example of this nested JSON structure is shown in the result MQTT message examples section in TABLE 9 below.

M-of-N is a filter process that employs M samples of N population to be within an upper and lower threshold in order to trigger an event. Within AOS system, M-of-N rules can be applied to any calculation node (including sensor nodes) to determine the system's current state of operation. Using M-of-N as a filtering process allows systems and processes to be evaluated at an aggregate level, while still alarming if a defined portion of the calculations are within one or more thresholds (e.g., trigger an alarm state if 90% of temperature readings are between 200 and 300 degrees). Especially for inherently noisy sensor feeds, this allows for reduction in false positives. Details on the JSON package of M-of-N rules are listed in TABLE 7 below.

TABLE 7

| M-of-N Result Field | JSON Tag | Data Format | Description |
|---|---|---|---|
| Model Name | model | Variable Character | Title of the AOS model - declares the system and location being analyzed |
| Node Name | node | Variable Character | Calculation title within the AOS model |
| Output Type | output_type | Variable Character | Declaration of the JSON package type (mofn_result) |
| Evaluation Start Timestamp | timestamp_evaluation_start | Date-time | Time defined by the start of the current evaluation window |
| Evaluation End Timestamp | timestamp_evaluation_end | Date-time | Time defined by the end of the current evaluation window |
| Rule Set | rule_set | Variable Character | Description of the class of rules being monitored on the AOS calculation node |
| Rule Summary | rule_summary | Variable Character | Human readable summary of the inequality expression governing the Black Swan rule |
| Rule Left Side Value | rule_left_value | Double Precision | First value in the Black Swan inequality |
| Rule Left Inclusive | rule_left_inclusive | True/False | Boolean statement of whether the inequality is inclusive of the left side value |
| Rule Right Side Value | rule_right_value | Double Precision | Second value in the Black Swan inequality |
| Rule Right Inclusive | rule_right_inclusive | True/False | Boolean statement of whether the inequality is inclusive of the right side value |
| Rule Percentage | rule_percentage | Double Precision | The required percentage of model results that are required to be within the inequality for the rule to be true |

TABLE 7-continued

| M-of-N Result Field | JSON Tag | Data Format | Description |
|---|---|---|---|
| Result Percentage | result_percentage | Double Precision | Percentage of all output values from the current evaluation that are within the M-of-N thresholds |
| Output Value | rule_output | Double Precision | Output state used to differentiate multiple M-of-N rules |
| Message | rule_message | Variable Character | Human readable explanation of the M-of-N occurrence |

The M-of-N result MQTT messages may be subscribed to with the topic of aos/results/m_of_n.

Intelligent predictor rules allow an AOS model to estimate the future point in time in which a calculated or sensor node will intersect a defined threshold. The intelligent predictor rules are associated with a certain portion of the stochastic distribution (e.g., $10^{th}$ percentile, median value, or $90^{th}$ percentile) and use a running history of previous evaluation states to determine the trend of a variable. Selection of the distribution section should reflect the severity of system response if the threshold is reached. A historical trend is used to forecast forward in time to determine the date-time at which the defined threshold value will be crossed. The model architecture also sets a minimum time window which to focus on threshold crossings. In other words, a motor temperature is estimated to cross a critical level in 10 days, but the model architecture is configured to provide an alert notification when the predicted crossing is less than three days. Thresholds can be defined as either upper limits or lower limits at the time of model architecture. TABLE 8 below describes the outputs generated by the intelligent predictor rules.

TABLE 8

| Intelligent Predictor Result Field | JSON Tag | Data Format | Description |
|---|---|---|---|
| Model Name | model | Variable Character | Title of the AOS model - declares the system and location being analyzed |
| Node Name | node | Variable Character | Calculation title within the AOS model |
| Output Type | output_type | Variable Character | Declaration of the JSON package type (intelligent_predictor_result) |
| Evaluation Start Timestamp | timestamp_evaluation_start | Date-time | Time defined by the start of the current evaluation window |
| Evaluation End Timestamp | timestamp_evaluation_end | Date-time | Time defined by the end of the current evaluation window |
| Threshold Name | threshold_name | Variable Character | Description of the class of rules being monitored by the AOS calculation node |
| Threshold Value | threshold_value | Double Precision | Value for which the Intelligent Predictor trend line is being calculated to cross |
| Threshold Analysis Point | threshold_analysis_point | Integer | Portion of the stochastic distribution used to create the Intelligent Predictor trend line |
| Threshold Type | threshold_type | Variable Character | Declaration of whether the threshold is an upper_threshold or a lower_threshold |
| Threshold Analysis Point Value | threshold_analysis_point_value | Double Precision | Current result of the node during this evaluation - only the portion of the stochastic distribution needed for Intelligent Predictor rule |
| Threshold Analysis Point Filtered Value | threshold_analysis_point_filtered_value | Double Precision | Value of the percentile result of the node after being applied with a stochastic filter |
| History Size | threshold_history_size | Integer | Number of historical data points used for the Intelligent Predictor trend line |

TABLE 8-continued

| Intelligent Predictor Result Field | JSON Tag | Data Format | Description |
|---|---|---|---|
| Threshold Notification Time Window | threshold_notification_time_window | Long Integer | Minimum time required for the time to intersection that will generate a Notification - predicted intersections longer than the time window will not generate a Notification |
| Prediction Timestamp | result_timestamp_prediction | Date-time | Date-time at which the Intelligent Predictor will intercept the defined threshold value; may be NULL if current trend will not intercept |
| State | result_state | Integer | State of the Intelligent Predictor trend line with respect to the threshold settings |
| State Name | result_state_name | Variable Character | Description of Intelligent Predictor state |
| Threshold Notification Generation Status | result_threshold_notification_generated | True/False | Statement of whether a Notification was generated by this Intelligent Predictor rule - Notifications are only generated when the intersection is within the time window and a Notification has not already been sent within the preset Notification refresh time |

Intelligent Predictor result MQTT messages may be subscribed to with the topic of aos/results/intelligent_predictor.

TABLE 9 below provides examples of outgoing AOS result MQTT messages for each result type described above. Line returns are for illustrative purposes only.

TABLE 9

```
->aos/results/node {
                    "model": "Motor Model v2.7 Dallas Plant 544 Installation A533",
                    "node": "Motor A Temperature above Ambient",
                    "timestamp_evaluation_start": 1473264435670,
                    "timestamp_evaluation_end": 1473264436670,
                    "result_min": 10.0,
                    "result_10": 10.5,
                    "result_30": 11.2,
                    "result_50": 12.1,
                    "result_70": 13.5,
                    "result_90": 14.9,
                    "result_max": 17.0
                    }
->aos/results/black_swan {
                    "model": "Motor Model v2.7 Dallas Plant 544 Installation A533",
                    "node": "Motor A Temperature",
                    "topic": "PLANT544/A533/MOTORA/TEMPERATURE",
                    "output_type": "black_swan_result",
                    "timestamp_evaluation_start": 1473264435670,
                    "timestamp_evaluation_end": 1473264436670,
                    "rule_name": "Critical Motor Temperature",
                    "rule_output": 1,
                    "rule_summary": "550.0 <= x < 9E99",
                    "rule_left_value": 550.0,
                    "rule_left_inclusive": true,
                    "rule_right_value": 9e99,
                    "rule_right_inclusive": false,
                    "result_value": 575.6,
                    "result_value_sensor_timestamp": 1473264405670,
                    "result_sensor_data_range_count": 1,
                    "result_sensor_data_count": 100,
```

TABLE 9-continued

```
                "result_sensor_data_range_percentage": 1.0,
                "rule_message": "Temperature temporarily reached critical threshold, monitor for anomalies in continued operations",
                "concurrent_sensors": [
                    {
                        "node": "Motor B Temperature",
                        "topic": "PLANT544/A533/MOTORB/TEMPERATURE",
                        "result_value": 150.3,
                        "result_value_sensor_timestamp": 1473264405670
                    },
                    {
                        "node": "Motor A RPM",
                        "topic": "PLANT544/A533/MOTORA/RPM",
                        "result_value": 5700.0,
                        "result_value_sensor_timestamp": 1473264405660
                    },
                    {
                        "node": "Motor B RPM",
                        "topic": "PLANT544/A533/MOTORB/RPM",
                        "result_value": 3000.0,
                        "result_value_sensor_timestamp": 1473264405660
                    }
                ]
            }
->aos/results/m_of_n    {
                "model": "Motor Model v2.7 Dallas Plant 544 Installation A533",
                "node": "Motor A Temperature above Ambient",
                "output_type": "m_of_n_result",
                "timestamp_evaluation_start": 1473264435670,
                "timestamp_evaluation_end": 1473264436670,
                "rule_set": "Motor A Temperature Above Ambient Status",
                "rule_summary": "100 <= x < 200"
                "rule_left_value": 100.0,
                "rule_left_inclusive": true,
                "rule_right_value": 200.0,
                "rule_right_inclusive": false,
                "rule_percentage": 85.0,
                "result_percentage": 95.1,
                "rule_output": 1,
                "message": "Motor A Temperature within elevated range."
            }
->aos/results/intelligent_predictor    {
                "model": "Motor Model v2.7 Dallas Plant 544 Installation A533",
                "node": "Motor A Temperature above Ambient",
                "output_type": "intelligent_predictor_result",
                "timestamp_evaluation_start": 1473264435670,
                "timestamp_evaluation_end": 1473264436670,
                "threshold_name": "Motor A Temperature above Ambient Upper Limit",
                "threshold_value": 250.0,
                "threshold_analysis_point": 90,
                "threshold_type": "upper_threshold",
                "threshold_analysis_point_value": 210.5,
                "threshold_analysis_point_filtered_value": 227.3,
                "threshold_history_size": 100,
                "threshold_notification_time_window": 86400000
                "result_timestamp_prediction": 1473264557430,
                "result_state": 2,
                "result_state_name": "NOT_CROSSED_AND_APPROACHING",
                "result_threshold_notification_generated": true
            }
```

Notification messages are intended for immediate consumption by other system or operators, and are only generated when further action or monitoring of the system is suggested by the AOS model. If bandwidth or storage issues are expected, it is suggested that the notification MQTT message be subscribed to, and the result MQTT messages be ignored. Black Swan, M-of-N and intelligent predictor rules can all generate notifications. Additionally, AOS notifications can also be published to email or SMS addresses with all or portion of the MQTT message.

The parent topic for notification messages is aos/notifications. Child topics for the different rule types are available at aos/notifications/black_swan, aos/notifications/m_of_n, and aos/notifications/intelligent_predictor MQTT topic addresses.

Whereas results MQTT messages may include normal or acceptable operating conditions, notifications are generated when attached to an associated Black Swan, M-of-N or intelligent predictor rule threshold. For Black Swan and M-of-N rules, this forces the model architect to directly associate an MQTT notification alert to a threshold setting. Intelligent predictor notifications are generated when the difference in time from the current evaluation time to the predicted threshold crossing time is within a minimum threshold window. The threshold crossings occurring beyond this time threshold window are logged within the intelligent predictor results, but do not generate a notification.

Additionally, the notifications have a setting that determines the maximum frequency which to send the same notification. If a rule triggers more frequently than this setting, a notification is sent the first time the rule is trigged and then again at the defined notification frequency. For instance, a notification may be sent about once a day, even if the system is operating beyond a threshold consistently. This setting can be changed by the model architect and should reflect the severity of the system state when within the rule threshold.

The JSON payload for AOS notifications is the same as the AOS results description above with the following exceptions. The raw stochastic node results do not directly generate notifications. The output_type key value will reflect that the MQTT message is a notification, instead of a result. Values for output_type are black_swan_notification, m_of_n_notification, and intelligent_predictor_notification for Black Swan, M-of-N and intelligent predictor rules, respectively.

As described above, the exemplary embodiments provide both a method and corresponding apparatus consisting of various modules providing functionality for performing the steps of the method. The modules may be implemented as hardware (embodied in one or more chips including an integrated circuit such as an application specific integrated circuit), or may be implemented as software or firmware for execution by a processor. In particular, in the case of firmware or software, the exemplary embodiments can be provided as a computer program product including a computer readable storage medium embodying computer program code (i.e., software or firmware) thereon for execution by the computer processor. The computer readable storage medium may be non-transitory (e.g., magnetic disks; optical disks; read only memory; flash memory devices; phase-change memory) or transitory (e.g., electrical, optical, acoustical or other forms of propagated signals-such as carrier waves, infrared signals, digital signals, etc.). The coupling of a processor and other components is typically through one or more busses or bridges (also termed bus controllers). The storage device and signals carrying digital traffic respectively represent one or more non-transitory or transitory computer readable storage medium. Thus, the storage device of a given electronic device typically stores code and/or data for execution on the set of one or more processors of that electronic device such as a controller.

Although the embodiments and its advantages have been described in detail, it should be understood that various changes, substitutions, and alterations can be made herein without departing from the spirit and scope thereof as defined by the appended claims. For example, many of the features and functions discussed above can be implemented in software, hardware, or firmware, or a combination thereof. Also, many of the features, functions, and steps of operating the same may be reordered, omitted, added, etc., and still fall within the broad scope of the various embodiments.

Moreover, the scope of the various embodiments is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized as well. Accordingly, the appended claims are intended to include within their scope such processes, machines, manufacture, compositions of matter, means, methods, or steps

What is claimed is:

1. A distributed analytics computer system to control the operation of a plurality of monitored systems, comprising:
   an architect subsystem and an edge subsystem, said edge subsystem comprising a plurality of edge processing devices to be located proximate to said plurality of monitored systems, wherein:
   said architect subsystem is operable to deploy analytic models to said edge processing devices based on sensor characteristics of said monitored systems; and,
   each of said edge processing devices is operable to:
   1) receive at least one of said analytic models and independently perform predictive and prescriptive analytics on sensor data from at least one monitored system, wherein said prescriptive analytics includes a future action on a component of said monitored system associated with said sensor;
   2) provide control signals to said at least one monitored system according to said predictive and prescriptive analytics; and,
   3) periodically send information to said architect subsystem, including monitored system responses to said control signals, whereby said architect subsystem can modify said analytic models to improve system performance of said monitored systems.

2. The distributed analytics system as recited in claim 1, wherein said edge subsystem is configured to perform said predictive and prescriptive analytics on at least a component of said at least one monitored system based on said sensor data.

3. The distributed analytics system as recited in claim 1, wherein said information includes a current status of a component of said at least one monitored system associated with said sensor.

4. The distributed analytics system as recited in claim 1, wherein said information includes a characteristic of said at least one monitored system based on said sensor data from a plurality of sensors.

5. The distributed analytics system as recited in claim 1, wherein said predictive analytics includes an estimate of an operation of a component of said at least one monitored system associated with said sensor.

6. The distributed analytics system as recited in claim 5, wherein said estimate is the remaining operational life of said component of said at least one monitored system.

7. The distributed analytics system as recited in claim 1, wherein said prescriptive analytics are based on a threshold performance of a component of said at least one monitored system associated with said sensor.

8. The distributed analytics system as recited in claim 1, wherein said architect subsystem is remote from said edge subsystem.

9. The distributed analytics system recited in claim 1, wherein said architect subsystem aggregates the information received from a plurality of edge processing devices to modify the analytic models and redeploy to one or more of said edge processing devices.

10. A method in a distributed analytics system to control the operation of a plurality of monitored systems, said distributed analytics system comprising an architect subsystem and an edge subsystem, said edge subsystem comprising a plurality of edge processing devices located proximate to said plurality of monitored systems, said method comprising the steps of:
   deploying, from said architect subsystem, analytic models to said edge processing devices based on sensor characteristics of said monitored systems; and,
   receiving, at each of said edge processing devices, at least one of said analytic models, each of said edge processing devices operative to:
   1) independently perform predictive and prescriptive analytics on sensor data from at least one monitored system, wherein said prescriptive analytics includes a future action on a component of said monitored system associated with said sensor;
   2) provide control signals to said at least one monitored system according to said predictive and prescriptive analytics; and,
   3) periodically send information to said architect subsystem, including monitored system responses to said control signals, whereby said architect subsystem can modify said analytic models to improve system performance of said monitored systems.

11. The method as recited in claim 10, wherein performing said predictive and prescriptive analytics is on at least a component of said at least one monitored system based on said sensor data.

12. The method as recited in claim 10, wherein said information includes a current status of a component of said at least one monitored system associated with said sensor.

13. The method as recited in claim 10, wherein said information includes a characteristic of said at least one monitored system based on said sensor data from a plurality of sensors.

14. The method as recited in claim 10, wherein said predictive analytics includes an estimate of an operation of a component of said at least one monitored system associated with said sensor.

15. The method as recited in claim 14, wherein said estimate is the remaining operational life of said component of said at least one monitored system.

16. The method as recited in claim 10, wherein said prescriptive analytics are based on a threshold performance of a component of said at least one monitored system associated with said sensor.

17. The method as recited in claim 10, wherein said architect subsystem is remote from said edge subsystem.

18. The method recited in claim 10, further comprising the steps of said architect subsystem aggregating the information received from a plurality of edge processing devices to modify the analytic models and redeploy to one or more of said edge processing devices.

* * * * *